United States Patent [19]
Ritmiller, III

[11] Patent Number: 6,032,109
[45] Date of Patent: Feb. 29, 2000

[54] SMART SENSOR MODULE

[75] Inventor: George R. Ritmiller, III, Owings Mills, Md.

[73] Assignee: Telemonitor, Inc., Columbia, Md.

[21] Appl. No.: 08/949,284

[22] Filed: Oct. 21, 1997

Related U.S. Application Data

[60] Provisional application No. 60/028,837, Oct. 21, 1996.

[51] Int. Cl.[7] .................................................. G01D 18/00
[52] U.S. Cl. ............................... 702/104; 702/85; 73/1.01
[58] Field of Search .................................. 702/85, 87, 99, 702/100, 104, 107, 1.01

[56] References Cited

U.S. PATENT DOCUMENTS

| | | |
|---|---|---|
| 3,781,869 | 12/1973 | Sudnick et al. . |
| 4,303,984 | 12/1981 | Houvig . |
| 4,313,509 | 2/1982 | Engels . |
| 4,399,515 | 8/1983 | Gross . |
| 4,418,392 | 11/1983 | Hata . |
| 4,592,002 | 5/1986 | Bozarth, Jr. et al. . |
| 4,611,304 | 9/1986 | Butenko et al. . |
| 4,618,012 | 10/1986 | Yamano et al. . |
| 4,684,886 | 8/1987 | Doyle . |
| 4,715,003 | 12/1987 | Keller et al. . |
| 4,831,558 | 5/1989 | Shoup et al. . |
| 4,836,442 | 6/1989 | Beckey . |
| 4,845,649 | 7/1989 | Eckardt et al. . |
| 4,855,743 | 8/1989 | Hester . |
| 4,858,615 | 8/1989 | Meinema . |
| 4,868,476 | 9/1989 | Respaut . |
| 4,912,397 | 3/1990 | Gale er al. . |
| 4,956,795 | 9/1990 | Yamaguchi et al. . |
| 5,005,142 | 4/1991 | Lipchak et al. . |
| 5,014,229 | 5/1991 | Mofachern . |
| 5,038,143 | 8/1991 | Hester . |
| 5,089,979 | 2/1992 | McEachern et al. . |
| 5,107,146 | 4/1992 | El-Ayat . |
| 5,121,118 | 6/1992 | Hermann .................................. 341/118 |
| 5,122,970 | 6/1992 | Gilbert et al. . |

(List continued on next page.)

OTHER PUBLICATIONS

IEEE Standard for a Smart Transucer Interface for Sensors and Actuators, Abstract only, 1998.

Janusz Bryzek, "The Evolution of Smart Sensor and Transducer Design," Sensors, Oct. 1993, pp. 12–22.

Slide from presentation at 35th Annual Fuze Technology Conference, Apr. 10–11, 1991, one page.

*Primary Examiner*—Patrick Assouad

[57] ABSTRACT

A smart sensor module includes a microcontroller and a signal conditioning integrated circuit. In a preferred embodiment, the signal conditioning integrated circuit is a mixed signal application specific integrated circuit (ASIC) incorporating an instrumentation amplifier, offset correction, sensitivity correction, low pass filtering, an analog-to-digital converter (ADC), a temperature sensor, digital I/O interface, a crystal oscillator circuit, and power on reset open collector output. The ADC can be multiplexed to the transducer, the temperature sensor or an external input. All features of the ASIC can be dynamically reconfigured at any time by the microcontroller. Offset correction is implemented with a 4-bit coarse adjustment digital-to-analog converter (DAC) and a 7-bit fine adjustment DAC to control the instrumentation amplifier reference voltage. The coarse adjustment allows compensation of sensor-to-sensor offset variations, while the fine adjustment allows dynamic or real-time compensation of temperature-induced variations. The sensitivity correction is accomplished with a programmable system gain configured as a coarse gain adjustment and a fine gain adjustment. The coarse gain adjustment allows compensation of sensor-to-sensor sensitivity variations. The fine gain adjustment allows dynamic or real-time compensation of temperature-induced sensitivity variations. The smart sensor module allows very precise calibration of the sensor, signal processing capabilities, decision making capability and serial interface capability.

20 Claims, 22 Drawing Sheets

U.S. PATENT DOCUMENTS

| | | |
|---|---|---|
| 5,135,002 | 8/1992 | Kirchner et al. . |
| 5,146,788 | 9/1992 | Raynes . |
| 5,191,327 | 3/1993 | Talmadge et al. . |
| 5,231,990 | 8/1993 | Gauglitz . |
| 5,241,850 | 9/1993 | Kawate . |
| 5,243,544 | 9/1993 | Schoess . |
| 5,249,143 | 9/1993 | Staley, III . |
| 5,479,096 | 12/1995 | Szcyrbrak et al. . |
| 5,604,684 | 2/1997 | Juntunen . |
| 5,604,685 | 2/1997 | Seesink et al. . |
| 5,606,515 | 2/1997 | Mockapetris et al. . |
| 5,848,383 | 12/1998 | Yunus ........................................ 702/104 |
| 5,866,821 | 2/1999 | Raynes . |
| 5,902,925 | 5/1999 | Crispie et al. ........................... 73/1.88 |

SMART SENSOR MODULE

CROSS-REFERENCE TO RELATED APPLICATION

This application claims priority from U.S. Provisional Application Ser. No. 60/028,837, filed Oct. 21, 1996, the disclosure of which is incorporated herein by reference.

This invention was made with Government support under DAAL02-92-C-0034 awarded by the Department of the Army. The Government has certain rights in this invention.

BACKGROUND OF THE INVENTION

1. Field of the Invention

The present invention relates generally to transducers and, more particularly, to an interface circuit and smart sensor module for interfacing with a variety of analog transducers.

2. Discussion of the Related Art

Resistive bridge and other types of voltage output sensors are commonly used to measure acceleration, pressure and other types of conditions; however, imperfect matching of resistive components of the bridge as well as pre-existing stress on the sensor surface tend to produce variations of the initial offset voltage between sensors. In addition, bridge offset generally changes with the operating temperature. Traditional sensor design relied on analog circuitry to calibrate the initial zero offset and sensitivity of the sensor, as well as to compensate for nonlinear temperature errors of offset and sensitivity. Sensor-specific compensation and calibration data were stored using memory components including potentiometers and discrete and laser-trimmed resistors. More recently, digital signal processing has permitted sensor-specific data to be stored in programmable memory such as random access memory (RAM) and electrically programmable read only memory (EPROM).

Currently, there are two basic digital signal conditioning approaches for smart sensors providing an analog output signal. In the first approach, the sensor analog output signal is converted to a digital signal and signal conditioning is carried out in the digital domain, with the processed digital signal either being used directly by the microprocessor or converted back to the analog domain for use by other devices. A disadvantage of this type of approach is that sensor output must be digitized twice in addition to being conditioned in the digital domain. This can reduce signal resolution, introduce quantization errors and increase response time. The digital signal processing approach also requires a relatively powerful microprocessor capable of performing all of the calculations needed to condition the signal, thereby increasing the size and cost of the device as well as power consumption. In the second approach, sensor errors are corrected and normalized based on digitally programmable gain and offset adjustment of the input amplifier. While this approach permits the use of a less powerful microprocessor and concomitant reductions in size, cost and power consumption, the ability to accommodate different sensors is typically limited by the fixed component values of the system. In addition, the accuracy and range of correction is somewhat less than that typically possible with the digital signal processing approach due to practical limitations relating to the size of the digital-to-analog converters.

SUMMARY OF THE INVENTION

Accordingly, it is a primary object of the present invention to overcome the above-mentioned disadvantages of the prior art and to provide an improved smart sensor module for interfacing with a variety of resistive bridge and analog output sensors.

It is another object of the present invention to improve the accuracy of an analog sensor output with a smart sensor module having digitally controlled coarse and fine offset correction implemented in an input amplifier stage and digitally controlled coarse and fine gain correction implemented in separate low pass filtering stages.

It is yet another object of the present invention to provide compensation for sensor-to-sensor and temperature-induced sensor output errors in the analog domain using digitally controlled gain and offset corrections while providing local decision making capabilities and signal processing in the digital domain by converting the conditioned analog output signal to a digital signal and transferring the digital signal to a microcontroller for processing.

It is a further object of the present invention to reduce the amount of processing performed by the microcontroller in a smart sensor module by setting coarse offset and gain corrections for an analog output sensor to predetermined values and making fine offset and gain adjustments dynamically during operation.

Some of the advantages of the present invention over the prior art include the ability to program the smart sensor module to interface with a variety of analog output sensors, signal processing and decision making capability, improved sensor accuracy, increased dynamic range, and that the smart sensor module can be fabricated in a small package at low cost.

The present invention is generally characterized in a smart sensor module for compensation of sensor-to-sensor and temperature-induced errors in the analog output of a sensor including a microcontroller and a signal conditioning analog circuit. In a preferred embodiment, the signal conditioning circuit is a mixed signal application specific integrated circuit (ASIC) incorporating an instrumentation amplifier, offset correction, sensitivity correction, low pass filtering, an analog-to-digital converter (ADC), a temperature sensor, digital I/O interface, a crystal oscillator circuit, and power on reset open collector output. The ADC can be multiplexed to the sensor, the temperature sensor or an external input. All features of the ASIC can be dynamically reconfigured at any time by the microcontroller.

Offset correction is implemented with a 4-bit coarse adjustment digital-to-analog converter (DAC) and a 7-bit fine adjustment DAC to control the instrumentation amplifier reference voltage. The coarse adjustment allows compensation of sensor-to-sensor offset variations, while the fine adjustment allows dynamic or real-time compensation of temperature induced variations.

The sensitivity correction is accomplished with a programmable system gain configured as a coarse gain adjustment and a fine gain adjustment. The coarse gain adjustment allows compensation of sensor-to-sensor sensitivity variations. The fine gain adjustment allows dynamic or real-time compensation of temperature induced sensitivity variations.

The primary function of the microcontroller and ASIC is the compensation of the sensor for device-to-device and temperature induced errors. The smart sensor module then allows very precise calibration of the sensor, signal processing capabilities, decision making capability and serial interface capability. The level of calibration, processing and decision making can be determined by the microcontroller software. Six digital I/O pins can also be software programmed for any user desired function.

Another aspect of the present invention is generally characterized in a method of compensating for sensor-tosensor and temperature-induced errors in an analog sensor output using a microcontroller and signal conditioning analog circuitry including the steps of taking a temperature sample, retrieving fine gain and offset correction outputs from storage based upon the temperature sample, retrieving coarse gain and offset correction outputs from storage, amplifying the analog sensor output in an amplifier stage of the signal conditioning analog circuitry having a DC offset responsive to the coarse and fine offset outputs retrieved from storage and providing an amplified analog sensor output, filtering the amplified analog sensor output in a first low pass filter stage of the signal conditioning analog circuitry having a filter gain responsive to the coarse gain correction output retrieved from storage and providing a coarse gain corrected analog sensor output, and filtering the coarse gain corrected analog sensor output in a second low pass filter stage of the signal conditioning analog circuitry having a filter gain responsive to the fine gain correction output retrieved from storage and providing a fully compensated analog sensor output.

Other objects and advantages of the present invention will become apparent from the following description of the preferred embodiments taken with the accompanying drawings, wherein like parts in each of the several figures are identified by the same reference numerals.

DESCRIPTION OF THE PREFERRED EMBODIMENTS

Figure 1:
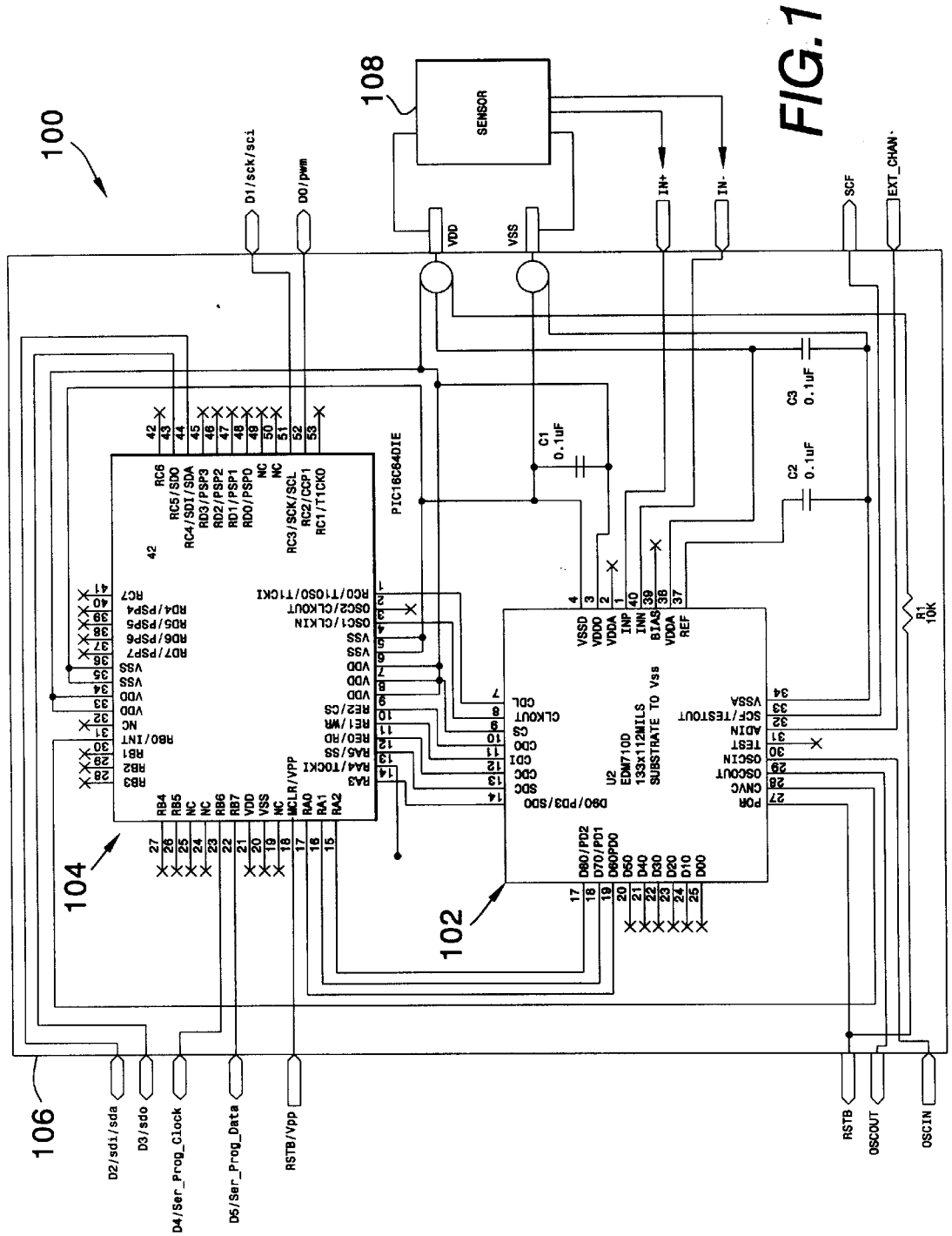
FIG. 1 is a schematic diagram of a smart sensor module according to the present invention.

A smart sensor module 100 in accordance with the present invention, as shown in FIG. 1, includes a signal conditioning integrated circuit 102 and a microcontroller 104 interoperatively disposed within a sixteen pin package or casing 106. A sensor 108, for example a piezoresistive bridge accelerometer, is shown disposed externally of package 106 but can be incorporated into the package to form an integrated sensing module if desired. Sensor 108 will typically produce an analog output or signal responsive to a sensed parameter such as acceleration or pressure. In the case of a piezoresistive bridge accelerometer, for example, a differential voltage is produced.

Signal conditioning integrated circuit 102 is shown as an application specific integrated circuit, or ASIC, with a configuration to condition a differential analog signal or output from sensor 108 and to convert the conditioned analog signal to a digital signal for processing by microcontroller 104. The signal conditioning ASIC is preferably configured structurally as a dual in-line package (DIP) with forty pins or connectors and a die size of about 0.133 inch by about 0.112 inch, the particular number of pins and die size being dependent upon the functions to be performed by the ASIC as well as manufacturing considerations. Microcontroller 104 is shown as a forty pin EPROM-based 8-bit CMOS microcontroller of the type sold by Microchip Technology, Inc., of Chandler, Ariz., and designated PIC16C64; however, it will be appreciated that other types of microcontrollers can be used dependent upon the functions to be performed and criteria such as, for example, operating speed and power consumption.

Figure 2:
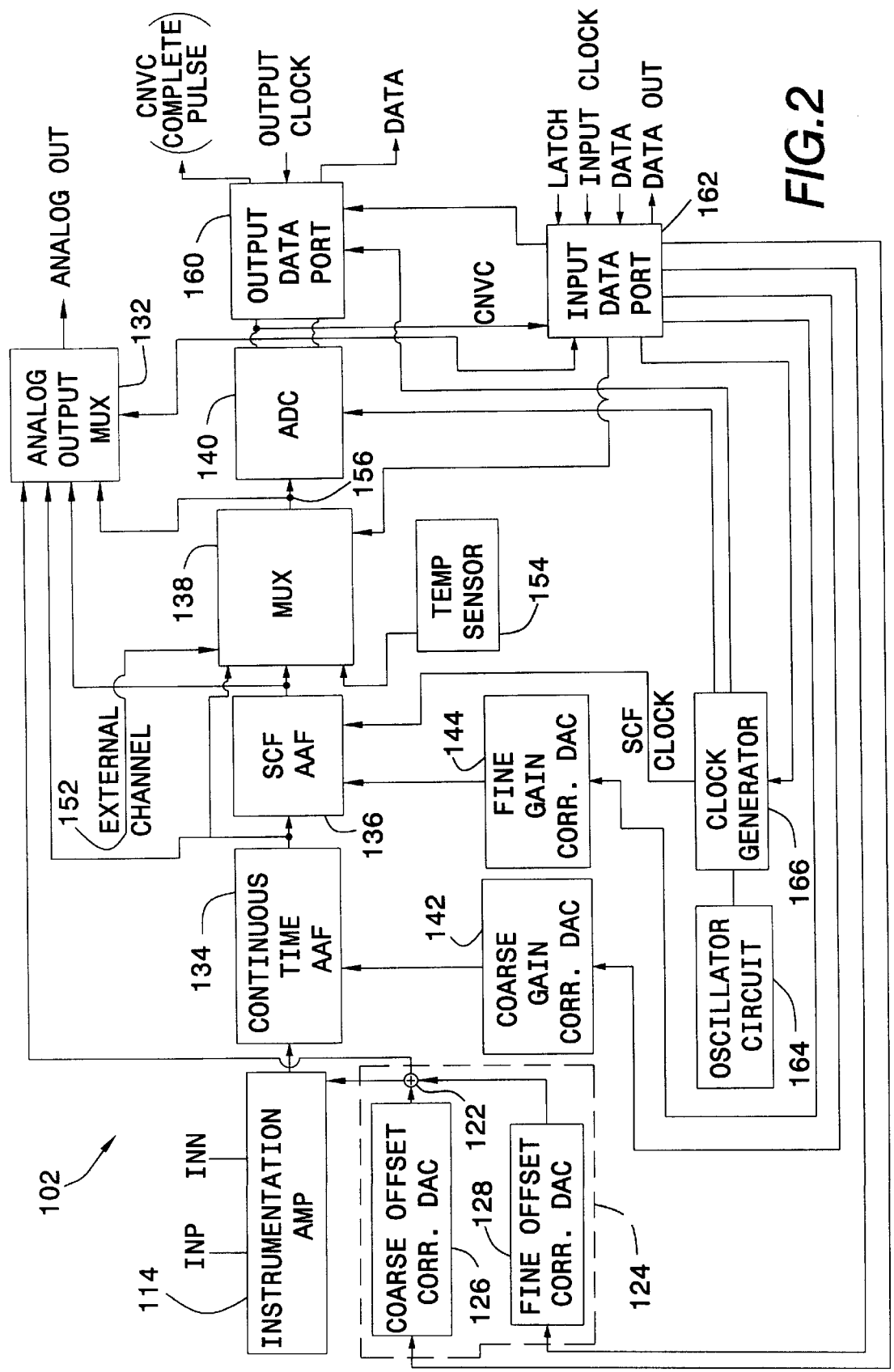
FIG. 2 is a block diagram of a signal conditioning ASIC for use in a smart sensor module according to the present invention.
Figure 3:
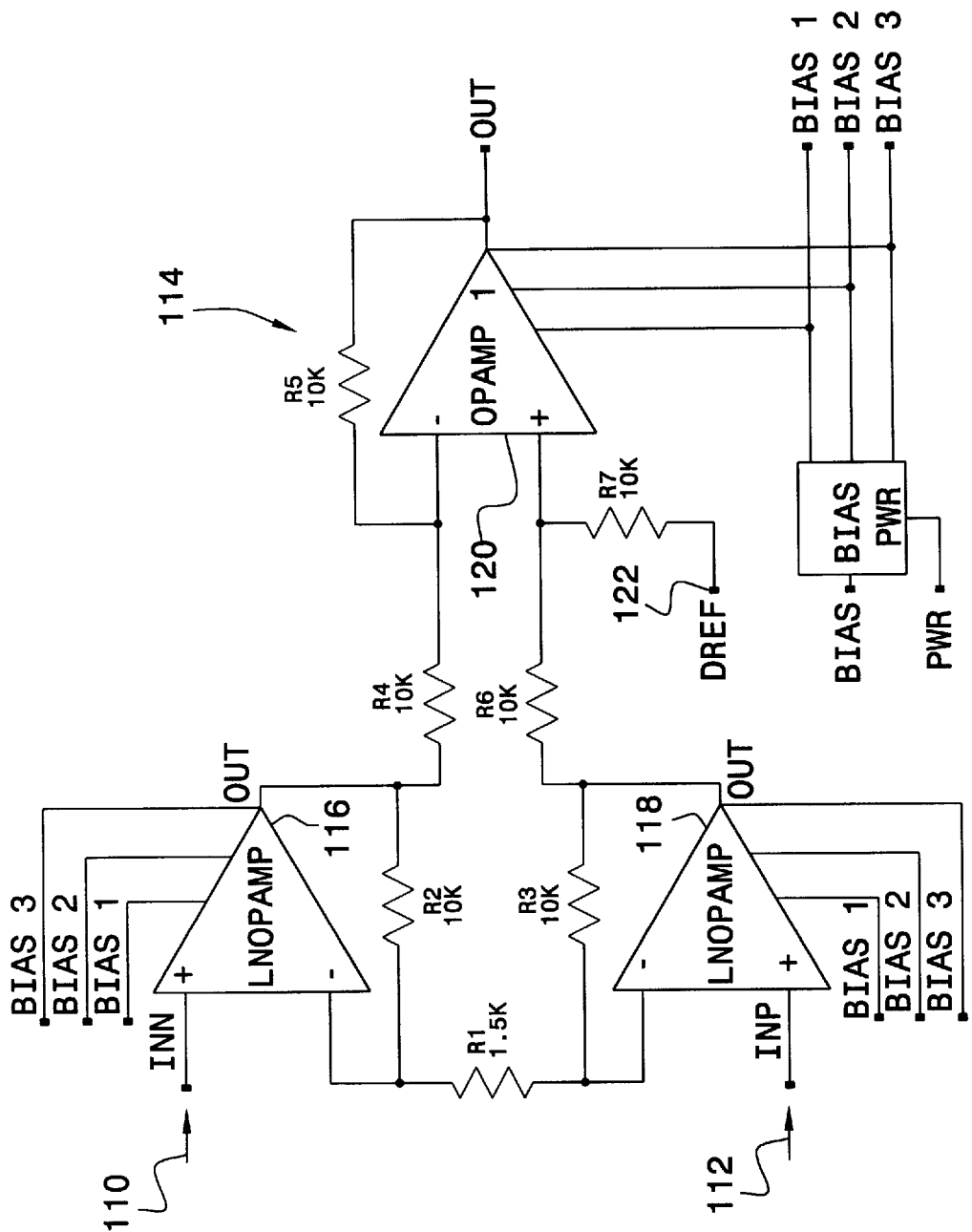
FIG. 3 is a schematic diagram of an instrumentation amplifier for use in the signal conditioning ASIC of a smart sensor module according to the present invention.

With reference to FIGS. 1 and 2, it can be seen that differential output signals 110 and 112 from sensor 108 are fed to the signal conditioning ASIC 102 via pins 1 and 40 to be applied at inverting and non-inverting input terminals (INN and INP) of an instrumentation amplifier 114. As best seen in FIG. 3, instrumentation amplifier 114 has an input stage composed of a pair of operational amplifiers or op-amps 116 and 118 and an output stage composed of a single op-amp 120. Negative feedback resistors R2 and R3 are connected between the output and negative terminals of op-amps 116 and 118, with a resistor R1 of fixed or adjustable resistance connected between respective negative terminals of the op-amps, thereby providing high differential gain and unity common-mode gain. The amplified differential output from op-amps 116 and 118 is applied to positive and negative terminals of op-amp 120 via resistors R6 and R4, respectively, with a negative feedback resistor R5 connected between output and negative terminals of op-amp 120 and a resistor R7 connected between the positive terminal of op-amp 120 and the output terminal 122 of a reference adjustment circuit 124 used to compensate for DC offset of the sensor.

Figure 4:
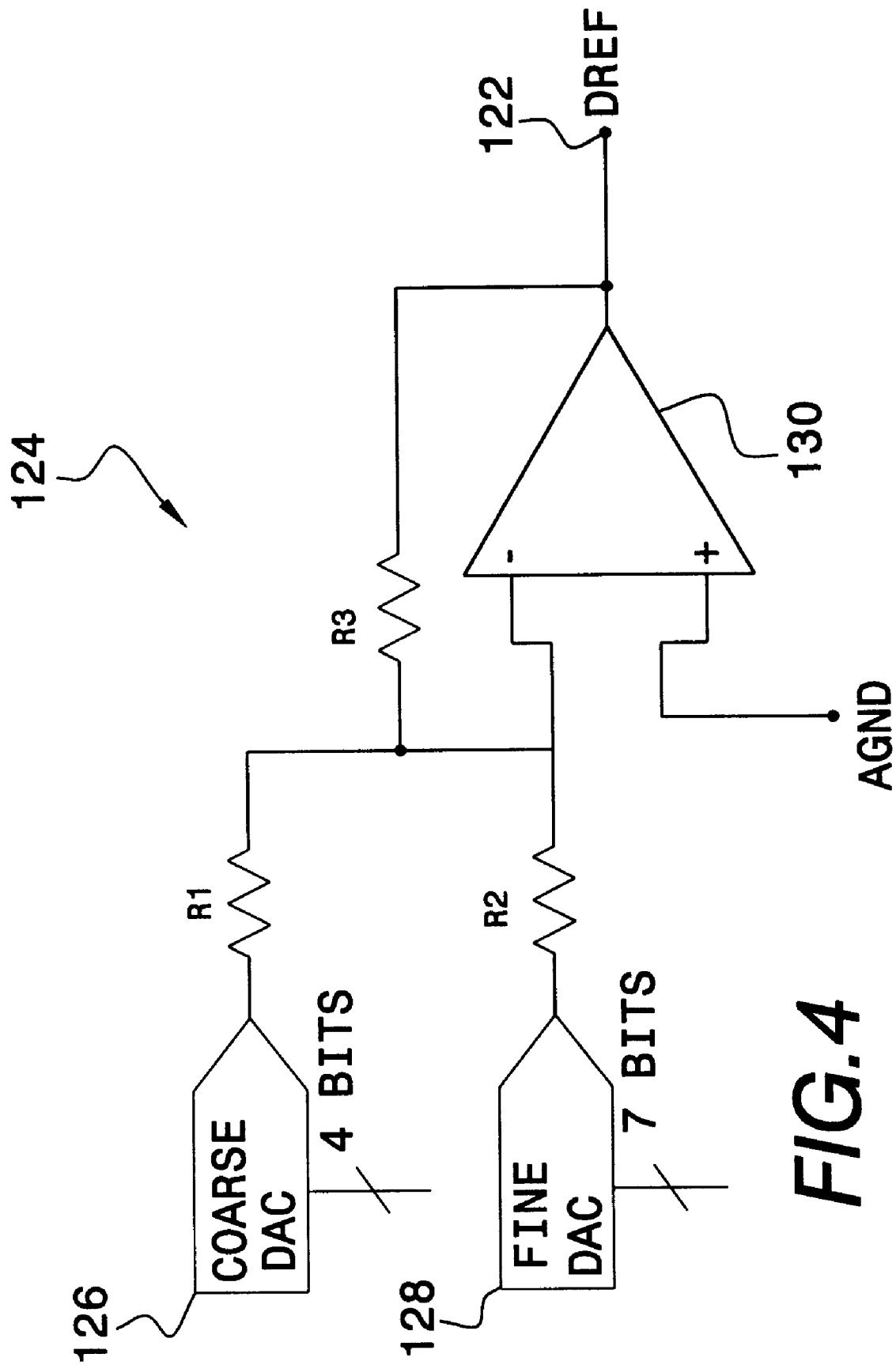
FIG. 4 is a simplified schematic diagram of a digital offset adjustment circuit for the instrumentation amplifier in the signal conditioning ASIC of a smart sensor module according to the present invention.

As best seen in FIG. 4, reference adjustment circuit 124 is composed of a coarse adjustment digital-to-analog convertor (DAC) 126 which corrects for sensor-to-sensor offset variations and a fine adjustment digital-to-analog convertor (DAC) 128 which corrects for temperature dependent offset changes in a particular sensor, the outputs of the coarse and fine adjustment DAC's being applied to the negative input terminal of a summing amplifier 130 via input resistors R1 and R2, respectively. Input resistors R1 and R2 are preferably equal but can be unequal if a weighted sum is desired. A negative feedback resistor R3 is connected between the negative terminal of the summing op-amp 130 and the op-amp output terminal 122, with the positive terminal going to analog ground (AGND). The total adjustment voltage (DREF) at the op-amp output terminal 122 is thus the sum of the coarse adjustment voltage from DAC 126 and the fine adjustment voltage from DAC 128. In one embodiment, the instrumentation amplifier 114 has a fixed gain of 23 dB±1 dB, and a maximum input signal (@ G min) of ±75 mV, with a designed frequency response defined by a low pass with $f_{3dB}$=100 kHz, and a manufactured frequency response of $f_{3dB} \geq 20$ kHz.

Figure 5:
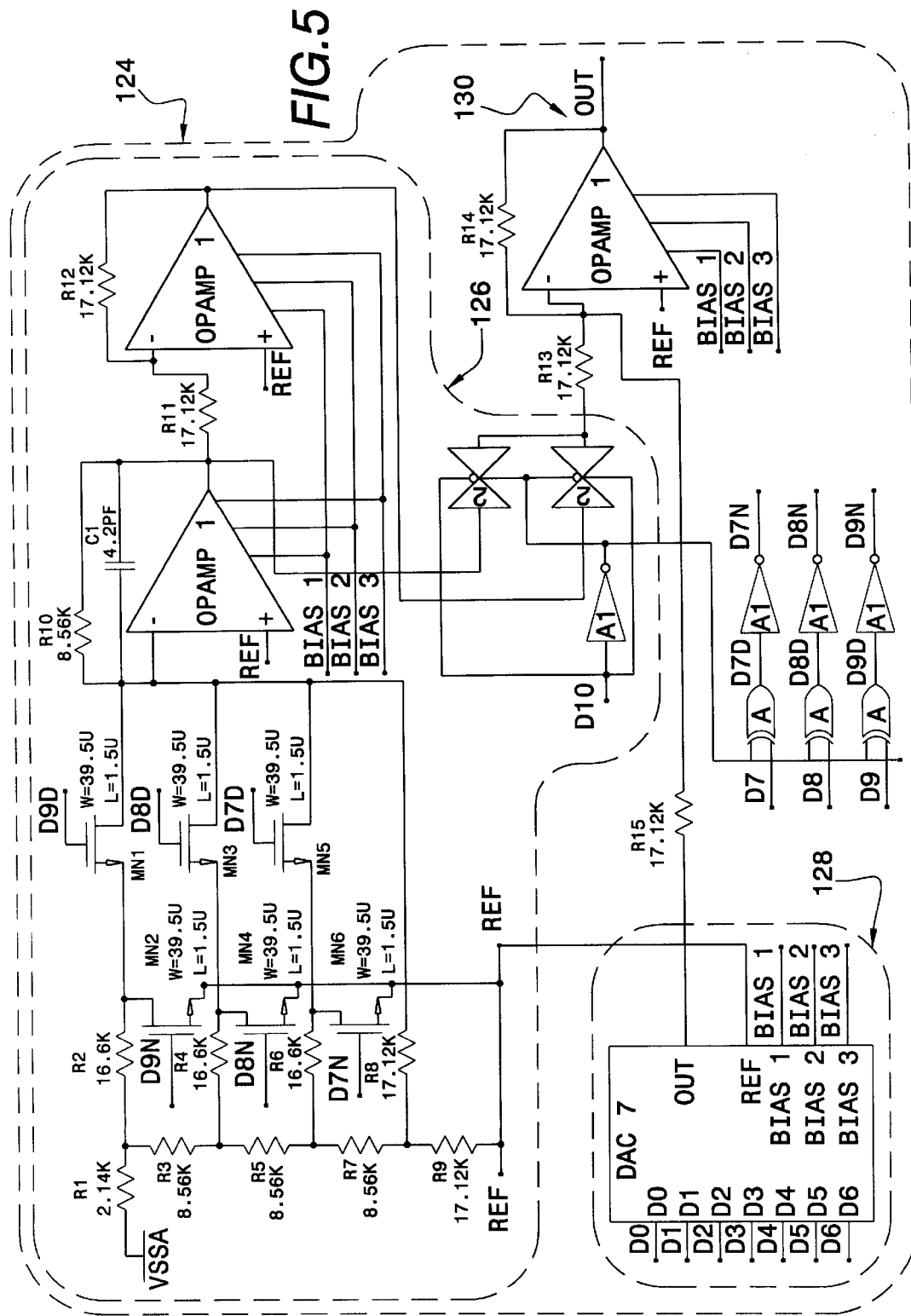
FIG. 5 is another schematic diagram of a digital offset adjustment circuit for the instrumentation amplifier in the signal conditioning ASIC of a smart sensor module according to the present invention showing the coarse offset DAC in greater detail.

Coarse and fine offset adjustment DACS 126 and 128 are controlled digitally by microcontroller 104 via selected control bits of a configuration data word (CDW) generated by the microcontroller in response to output data from the signal conditioning ASIC 102. While the coarse offset adjustment DAC 126 is shown in FIG. 4 as a 4-bit DAC, it will be appreciated that anywhere from 2- to 8-bit DACS can be used for coarse offset adjustment dependent upon the dynamic range needed to accommodate sensor-to-sensor offset variation. An exemplary 4-bit coarse offset adjustment DAC is shown in greater detail in FIG. 5 at 126 with summing amplifier 130 and fine offset adjustment DAC 128. Control bits DI20–DI23 of the CDW are applied to DAC 126 via the input terminals labeled D7–D10, respectively, in FIG. 5 to control the coarse offset adjustment in amplifier 114. In the case of a 4-bit DAC and a step size of, for example, about 64 mV±2%, the coarse adjustment will range from analog ground (AGND)–480 mV to AGND+480 mV as shown in Table I below.

TABLE I

Coarse Offset Control

| DI23 | DI22 | DI21 | DI20 | Coarse Adj. $V_{REF}$ + X mV |
|------|------|------|------|------|
| 0 | 0 | 0 | 0 | −480 |
| 0 | 0 | 0 | 1 | −416 |
| : | : | : | : | : |
| 0 | 1 | 1 | 1 | −32 |
| 1 | 0 | 0 | 0 | +32 |
| : | : | : | : | : |
| 1 | 1 | 1 | 0 | +496 |
| 1 | 1 | 1 | 1 | +480 |

Figure 6:
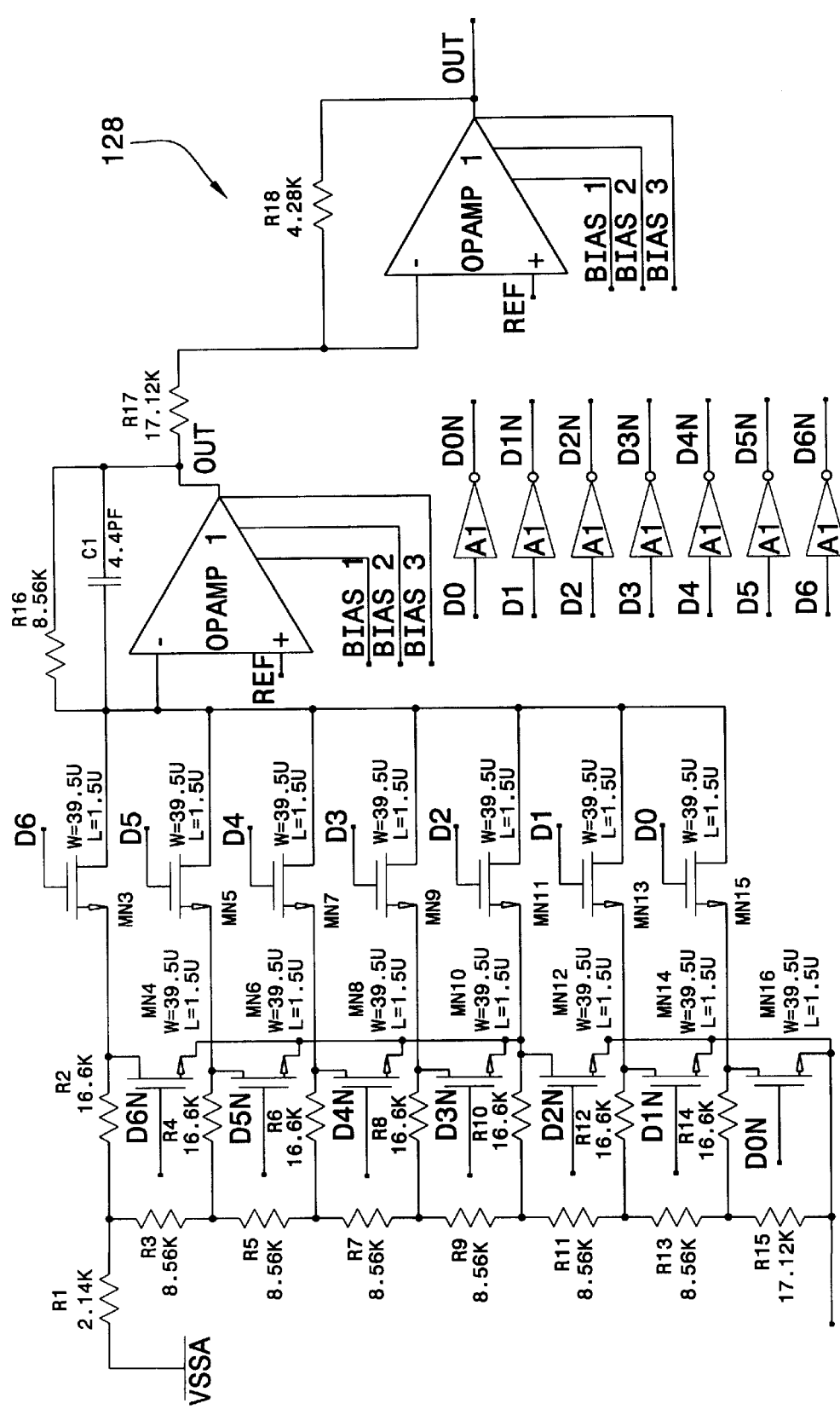
FIG. 6 is a schematic diagram of a fine offset adjustment DAC for the digital offset adjustment circuit in the signal conditioning ASIC of a smart sensor according to the present invention.

The fine offset adjustment DAC 128 is shown in FIG. 4 as a 7-bit DAC; however, anywhere from 6- to 16-bit DACs can be used for fine offset adjustment dependent upon the degree of resolution needed for a particular sensor. In the case of a 7-bit DAC and a step size of, for example, about 1 mV±2%, the fine adjustment will range from about 0 to about 127 mV as shown in Table II below, where DI8–DI14 are the control bits of the CDW generated by the microcontroller and applied to inputs of DAC 128 to control the fine offset adjustment. An exemplary configuration for the 7-bit DAC 128 is shown in FIG. 6, it being noted that control bits DI8–DI14 are applied to the DAC via input terminals labeled D0–D7 in that figure.

TABLE II

Fine Offset Control

| DI14 | DI13 | DI12 | DI11 | DI10 | DI9 | DI8 | Fine Adj. mV |
|------|------|------|------|------|-----|-----|------|
| 0 | 0 | 0 | 0 | 0 | 0 | 0 | +0 |
| 0 | 0 | 0 | 0 | 0 | 0 | 1 | +1 |
| . | | | | | | . | . |
| . | | | | | | . | . |
| . | | | | | | . | . |
| 1 | 0 | 0 | 0 | 0 | 0 | 0 | +64 |
| . | | | | | | . | . |
| . | | | | | | . | . |
| 1 | 1 | 1 | 1 | 1 | 1 | 1 | +127 |

By using a relatively less accurate coarse adjustment DAC with wide dynamic range to correct for typically large sensor-to-sensor offset variations and a separate fine adjustment DAC configured for significantly finer resolution over a narrower dynamic range to correct for typically small variations due, for example, to temperature, the offset adjustment circuit 124 of the present invention simplifies manufacture of the ASIC and reduces cost while at the same time providing more precise offset adjustment. Moreover, the full dynamic range of each DAC is utilized since each DAC needs only cover the compensated range of sensor output. Since the offset adjustment is hardware implemented, the microcontroller is also freed-up for higher level functions. In operation, the coarse adjustment is preferably set for individual sensors and thereafter left alone while the fine adjustment is used to cancel temperature dependent offset changes. The total offset correction DREF equals the coarse adjustment plus the fine adjustment or, using the exemplary values discussed above, some value between AGND–480 mV and AGND+607 mV. A connection is also made between output terminal 122 of the offset adjustment circuit and one channel of an analog output or test mode multiplexer (ANALOG OUTPUT MUX) 132 for external monitoring and testing.

Referring again to FIG. 2, the offset-corrected signal from instrument amplifier 114 is passed through a continuous time (CT) anti-aliasing filter (AAF) 134 and a switched capacitor filter (SCF) AAF136 before being fed into one channel of a primary or main multiplexer (MUX) 138 for sampling and application to an analog-to-digital converter (ADC) 140. The CT AAF prevents any signals from being aliased into the pass band of the SCF AAF while the SCF AAF prevents aliasing of the ADC. Coarse and fine gain correction DACs 142 and 144 are divided between CT AAF 134 and SCF AAF 136, respectively, to eliminate the need for a separate gain stage thereby simplifying manufacture and minimizing the size and power consumption of the device. Moreover, since absolute values of resistance in a feedback circuit are less easily controlled than relative values of capacitance in a switched capacitor feedback circuit, utilizing resistors of less accurately controlled value for coarse gain adjustments in one filtering stage and switched capacitor circuits of relatively high resolution for fine gain adjustments in the other filtering stage reduces cost and simplifies manufacturing of the ASIC.

Figure 7:
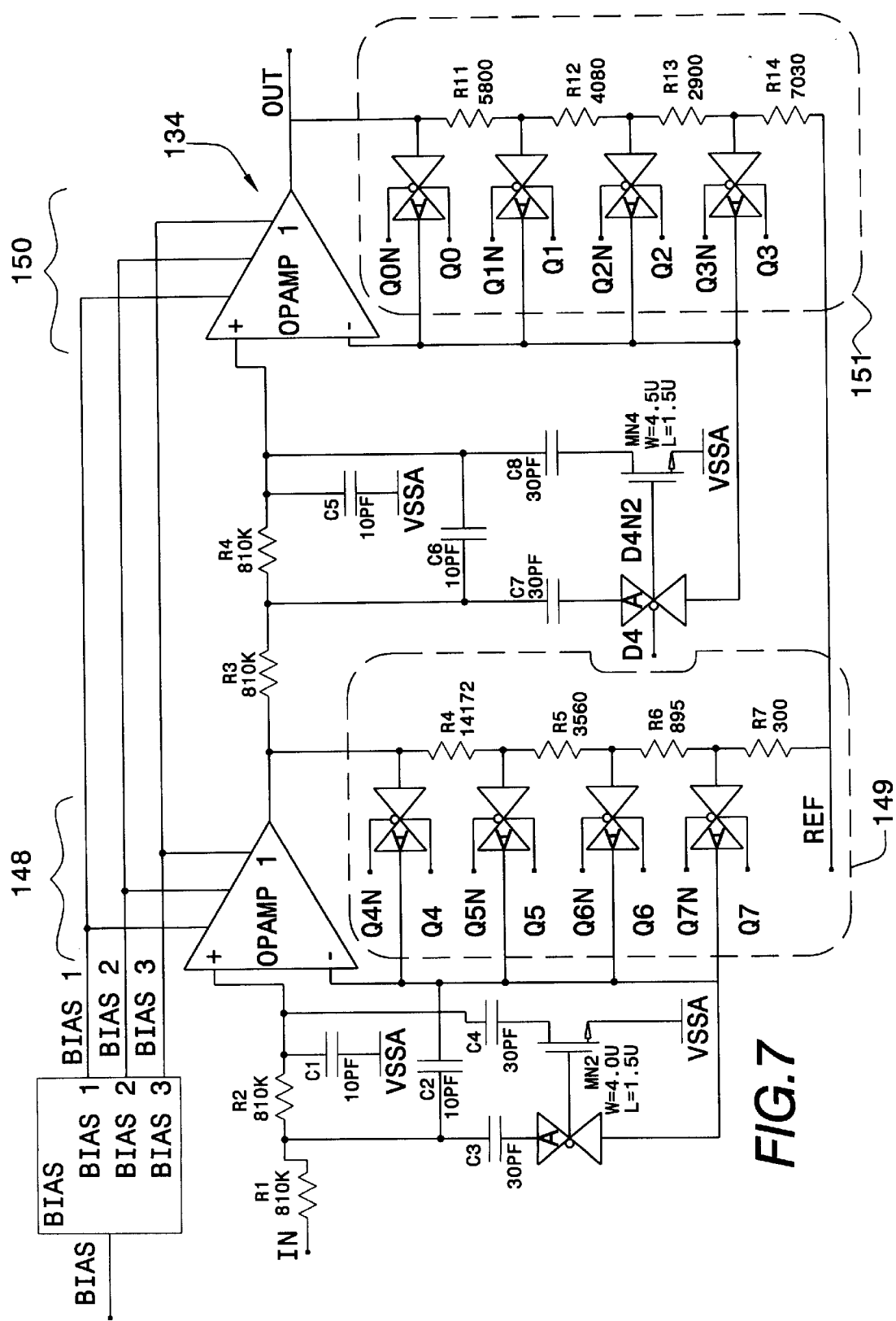
FIG. 7 is a schematic diagram of a continuous time anti-aliasing filter with coarse gain adjustment for use in the signal conditioning ASIC of a smart sensor module according to the present invention.
Figure 8:
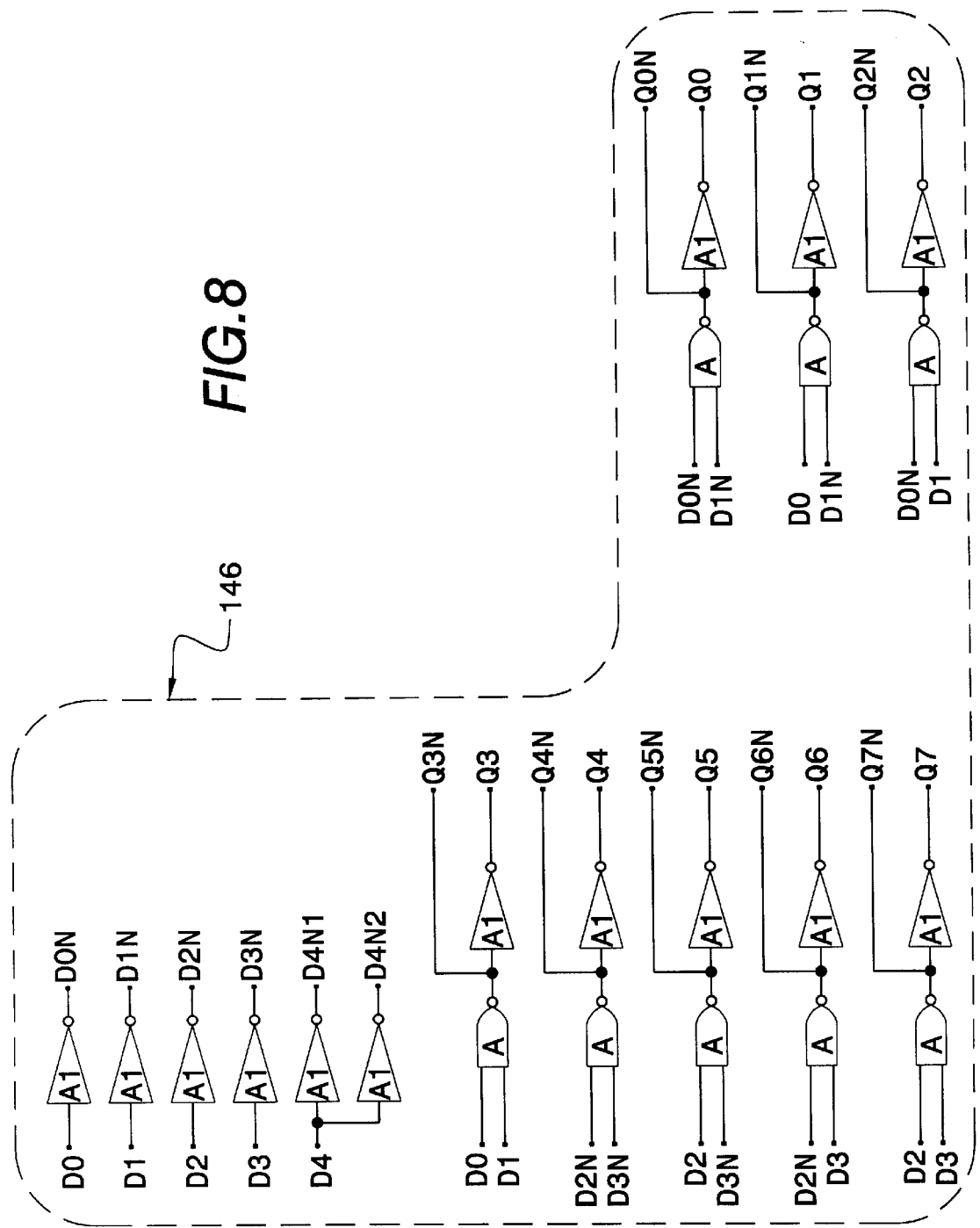
FIG. 8 is a schematic diagram of combinatorial control logic circuitry for the coarse gain adjustment DAC in the continuous time anti-aliasing filter shown in FIG. 7.

Referring to FIG. 7, an example of a continuous time anti-aliasing filter 134 is shown in the form of a pseudo-Butterworth low pass filter with 4 poles and a selectable corner frequency of 5 kHz±40% (3.5 to 6.0 kHz) or 20 kHz±40% (14 to 28 kHz), the corner frequency being selected by control bit DI7 of the CDW which is applied to the input terminal labeled D4 in FIG. 7. Filter 134 includes a first amplifier stage 148 with selectable gain implemented using a first resistive ladder network 149 of DAC 142, and a second amplifier stage 150 with selectable gain implemented using a second resistive ladder network 151 of DAC 142. As shown in FIG. 8, coarse gain control DAC 142 also includes a control logic circuit 146 for receiving 4-bit information from the microcontroller 104 and performing combinatorial logic to selectively choose between feedback resistors R4–R7 in the first resistive ladder network and feedback resistors R11–R14 in the second resistive ladder network to provide coarse control of the gain. The CT AAF is controlled by control bits DI16 through DI19 of the CDW, which are shown as D0–D3 in FIGS. 7 and 8. The coarse gain can be adjusted from 0 dB to 45 dB±5% in 3 dB steps by binary increments of DI16 through DI19 as shown in Table III below.

TABLE III

Coarse Gain Control

| DI19 | DI18 | DI17 | DI16 | Gain (dB) |
|------|------|------|------|-----------|
| 0 | 0 | 0 | 0 | 0 |
| 0 | 0 | 0 | 1 | 3 |
| 0 | 0 | 1 | 0 | 6 |
| 0 | 1 | 0 | 0 | 12 |
| 1 | 0 | 0 | 0 | 24 |
| 1 | 1 | 1 | 1 | 45 |

Figure 9:
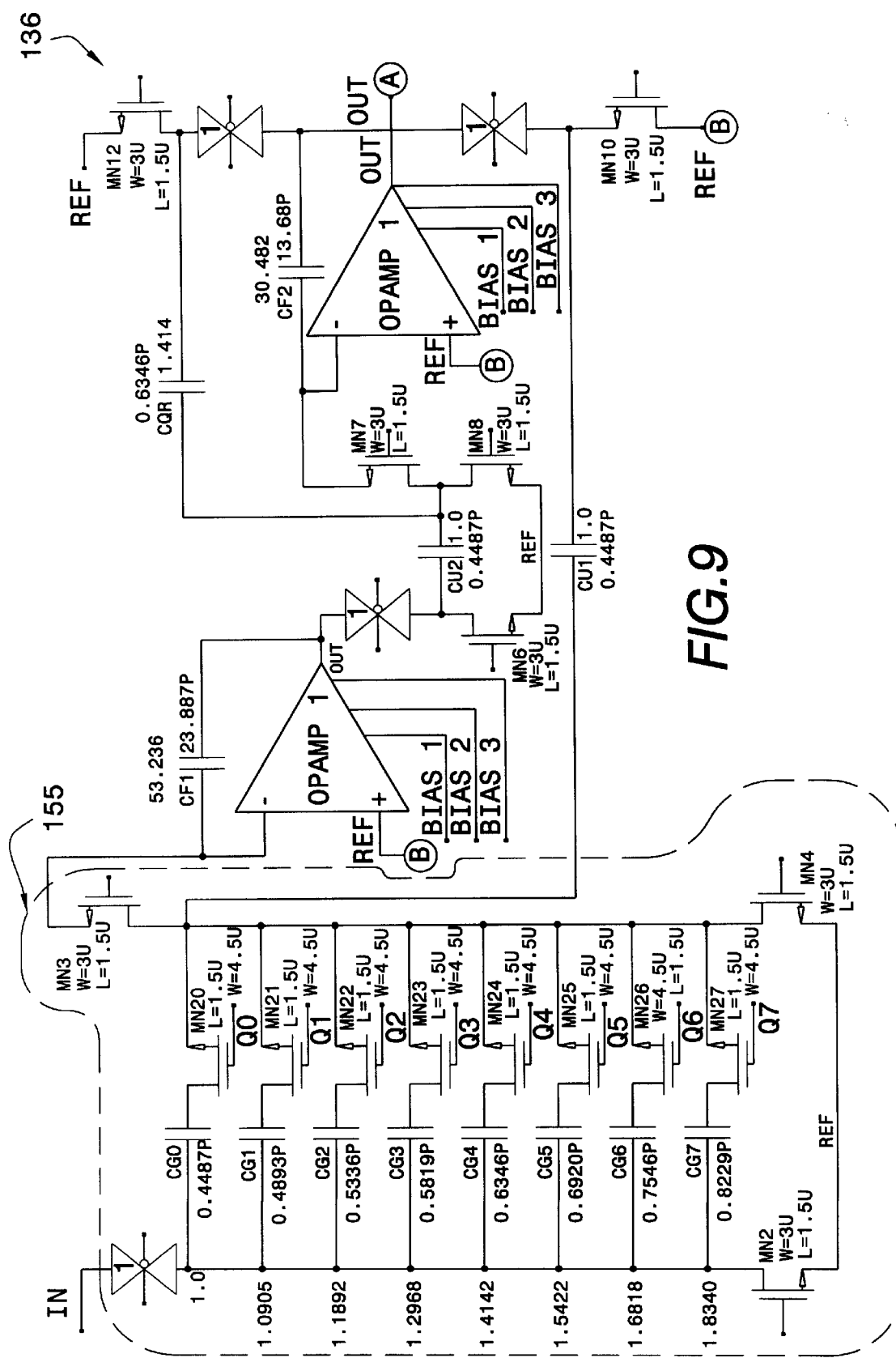
FIGS. 9 and 10 are schematic diagrams of a switched capacitor filter with fine gain adjustment for use in the signal conditioning ASIC of a smart sensor module according to the present invention.
Figure 10:
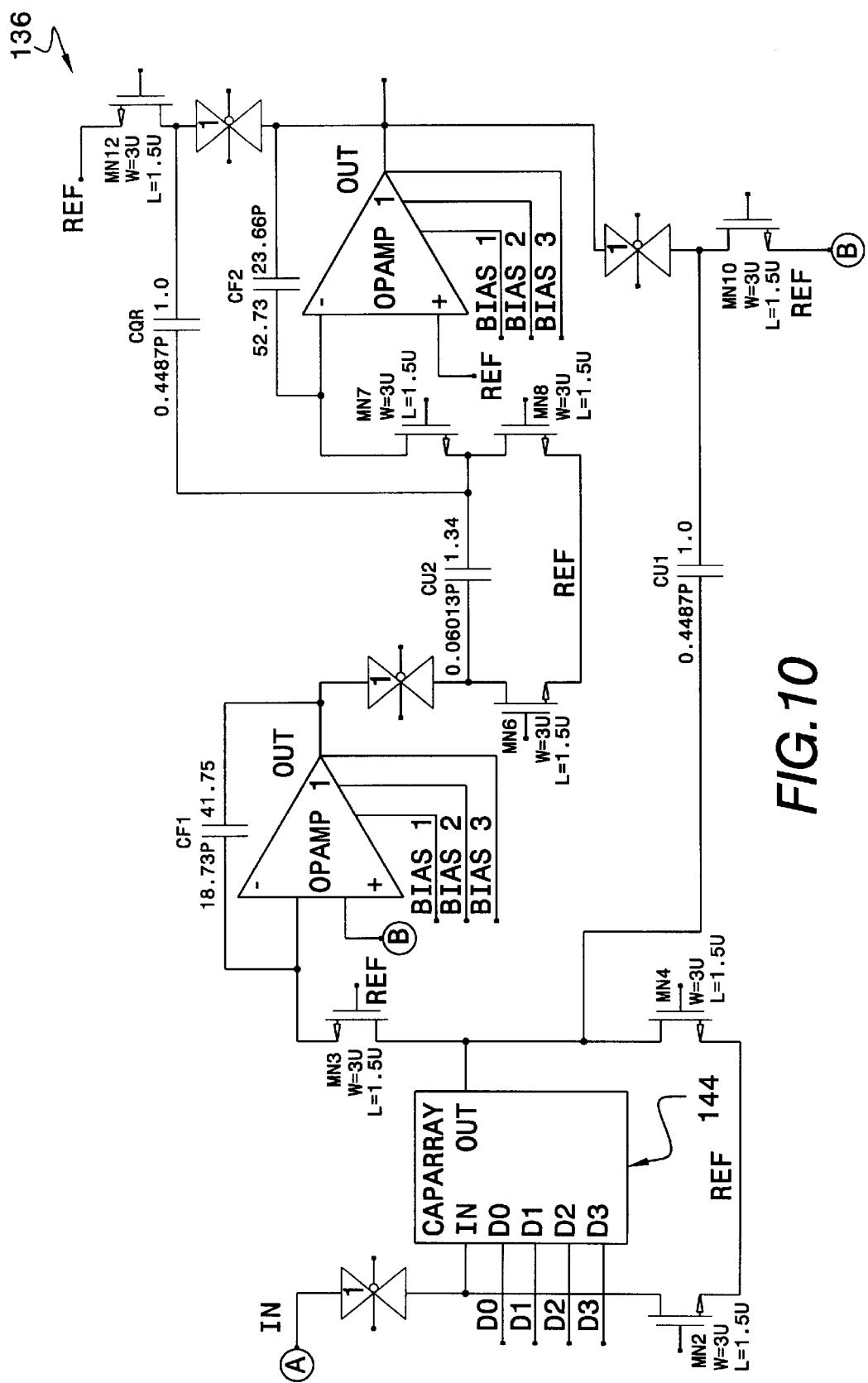

Switched capacitor filter 136 is shown in FIGS. 9 and 10 as a modified Butterworth low pass filter with 4 poles whose cutoff frequency is adjustable by varying the SCF clock frequency. The SCF clock frequency is generated by dividing the master clock, the divider ratio being controlled by control bits DI28 through DI30 of the CDW as shown in Table IV below. The control bits are applied to input terminals D4–D6, respectively, of a combinatorial logic circuit 153, shown in FIG. 11, which inverts the input signals and performs combinatorial logic using the inverted and non-inverted signals to generate eight control outputs Q0–Q7, the control outputs being applied to a capacitive DAC array 155 as shown in FIG. 9 to select the cut-off frequency for the filter. The corner frequency of the SCF anti-aliasing filter 136 shown is the SCF clock divided by 256.

Figure 12:
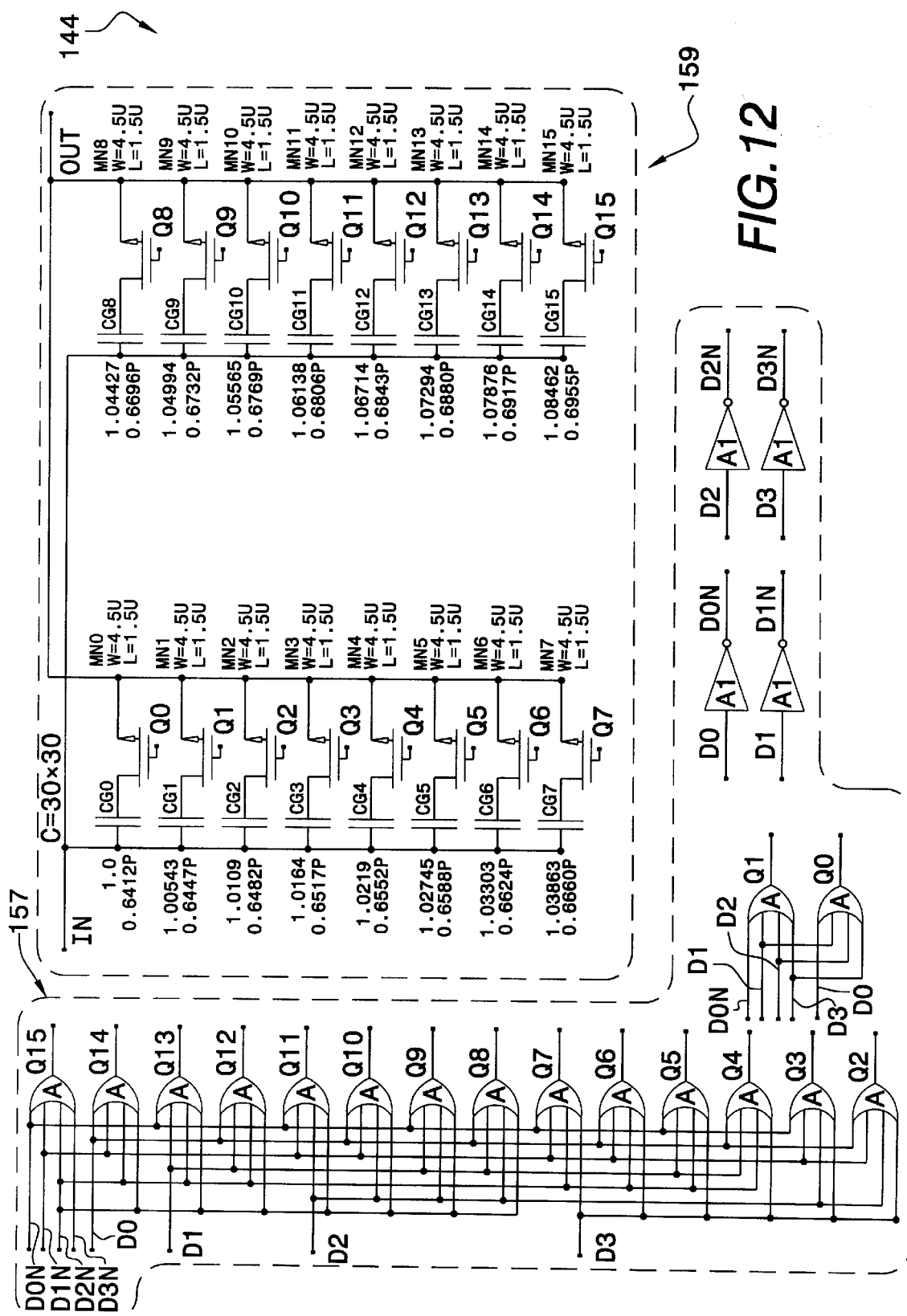
FIG. 12 is a schematic diagram of a capacitive DAC array and combinatorial control logic circuitry used to implement fine gain control in the switched capacitor filter shown in FIGS. 9 and 10.

As shown in FIG. 10, a fine gain correction DAC 144 has also been implemented in the switched capacitor filter circuit 136 and is controlled by control bits DI0 through DI6 of the CDW, the control bits being applied to input terminals D0–D3, respectively, of a combinatorial logic circuit 157, shown in FIG. 12, which inverts the input signals and performs combinatorial logic using the inverted and non-inverted signals to generate sixteen control outputs Q0–Q15. The control outputs are applied to a capacitive DAC array 159, also shown in FIG. 12, which adjusts relative values of capacitance to control the fine gain without the need for a separate gain stage. For the switched capacitor filter circuit shown, the fine gain ranges from about 3 to about 8.969 dB in steps of about 0.047 dB, and is controlled by binary increments of DI0 through DI6 as shown, for example, in Table V. For the circuit shown in FIGS. 9 and 10, the SCF clock to $f_{3dB}$ is 256:1, the max SCF clock frequency is 512 kHz, the 3 dB frequency accuracy is ±1% typical, ±2% max, the fine gain range is 3.000 to 8.969 dB, the fine gain step size is 0.047 dB, the accuracy is ±5%, and the monotonicity is ±1 LSB.

TABLE IV

Corner Frequency Control

| DI30 | DI29 | DI28 | Master/SCF Clock Ratio | Corner Freq. Master Clock = 4 MHz (Hz) |
|------|------|------|------------------------|-----------------------------------------|
| 0 | 0 | 0 | 1024 | 15.3 |
| 0 | 0 | 1 | 512 | 30.5 |
| 0 | 1 | 0 | 256 | 61.0 |
| 0 | 1 | 1 | 128 | 122.1 |
| 1 | 0 | 0 | 64 | 244.1 |
| 1 | 0 | 1 | 32 | 488.3 |
| 1 | 1 | 0 | 16 | 976.6 |
| 1 | 1 | 1 | 8 | 1953.1 |

TABLE V

Fine Gain Control

| DI6 | DI5 | DI4 | DI3 | DI2 | DI1 | DI0 | Gain (dB) |
|-----|-----|-----|-----|-----|-----|-----|-----------|
| 0 | 0 | 0 | 0 | 0 | 0 | 0 | 3 |
| 0 | 0 | 0 | 0 | 0 | 0 | 1 | 3.047 |
| 0 | 0 | 0 | 0 | 0 | 1 | 0 | 3.094 |
| 0 | 0 | 0 | 0 | 1 | 0 | 0 | 3.188 |
| 0 | 0 | 0 | 1 | 0 | 0 | 0 | 3.376 |
| 0 | 0 | 1 | 0 | 0 | 0 | 0 | 3.752 |
| 0 | 1 | 0 | 0 | 0 | 0 | 0 | 4.504 |
| 1 | 0 | 0 | 0 | 0 | 0 | 0 | 6.008 |
| 1 | 1 | 1 | 1 | 1 | 1 | 1 | 8.969 |

Figures 11, 13:
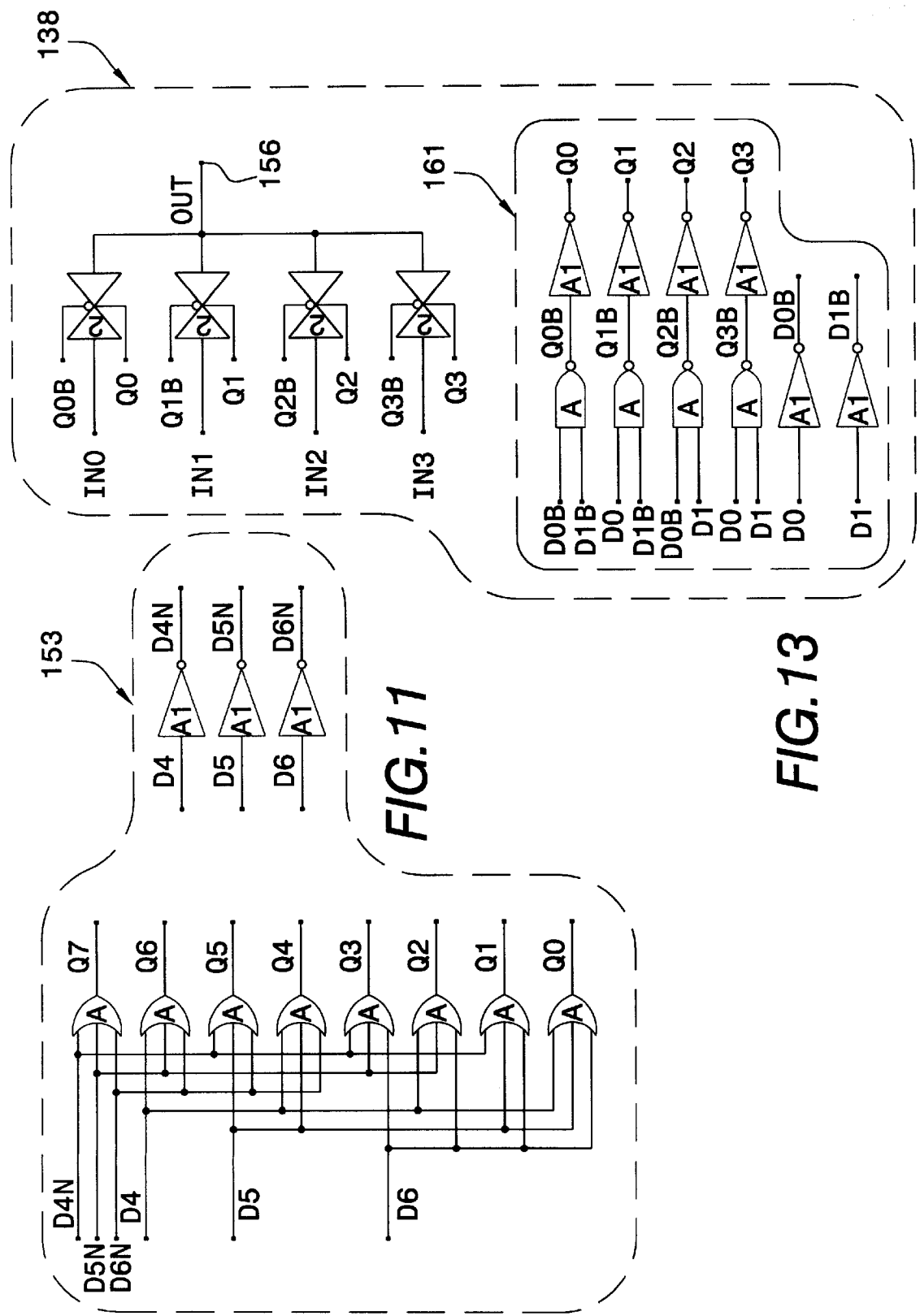
FIG. 11 is a schematic diagram of combinatorial control logic circuitry used to select the cut-off frequency for the switched capacitor filter shown in FIGS. 9 and 10.
FIG. 13 is a schematic diagram of a multiplexer for use in the signal conditioning ASIC of a smart sensor module according to the present invention.

As best seen in FIG. 13, multiplexer 138 is of conventional design with four input channels (IN0, IN1, IN2 and IN3) receiving signals from the switched capacitor anti-aliasing filter 136, an external source 152, the continuous-time anti-aliasing filter 134, and temperature sensor 154, respectively, and one output channel (OUT) 156 feeding the analog output MUX 132 and analog-to-digital converter (ADC) 140. The multiplexer is controlled by control bits DI24 and DI25 of the CDW as shown in Table VI below, the control bits being applied to inputs D0 and DI of a combinatorial logic circuit 161 which inverts the signals and uses the inverted and non-inverted signals to generate four control outputs which select the channel to be output. When the temperature sensor 154 is selected, the multiplexer will change when the new configuration data word is latched. After the temperature sensor sample is taken, the multiplexer will revert back to the analog channel. The impedance of the multiplexer should not affect the ADC reading.

TABLE VI

Multiplexer Control

| DI25 | DI24 | Selection TEST LO | Selection TEST HI |
|---|---|---|---|
| 0 | 0 | Analog Channel | Analog Channel |
| 0 | 1 | External Input | Offset DAC |
| 1 | 0 | SCF Bypass | SCF Bypass |
| 1 | 1 | Temperature Sensor | Temperature Sensor |

Figure 14:
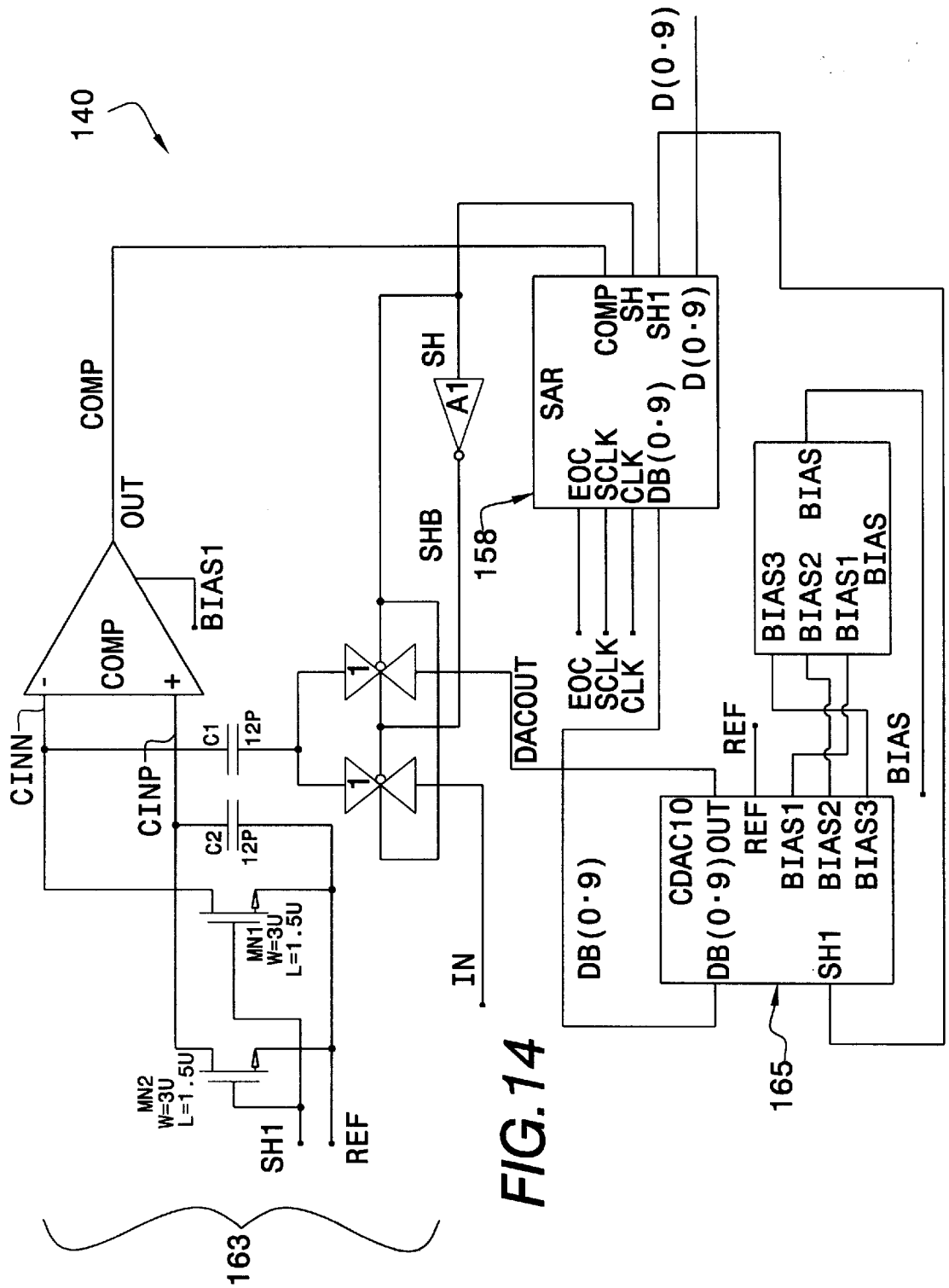
FIG. 14 is a schematic diagram of an analog-to-digital converter for use in the signal conditioning ASIC of a smart sensor module according to the present invention.
Figure 15:
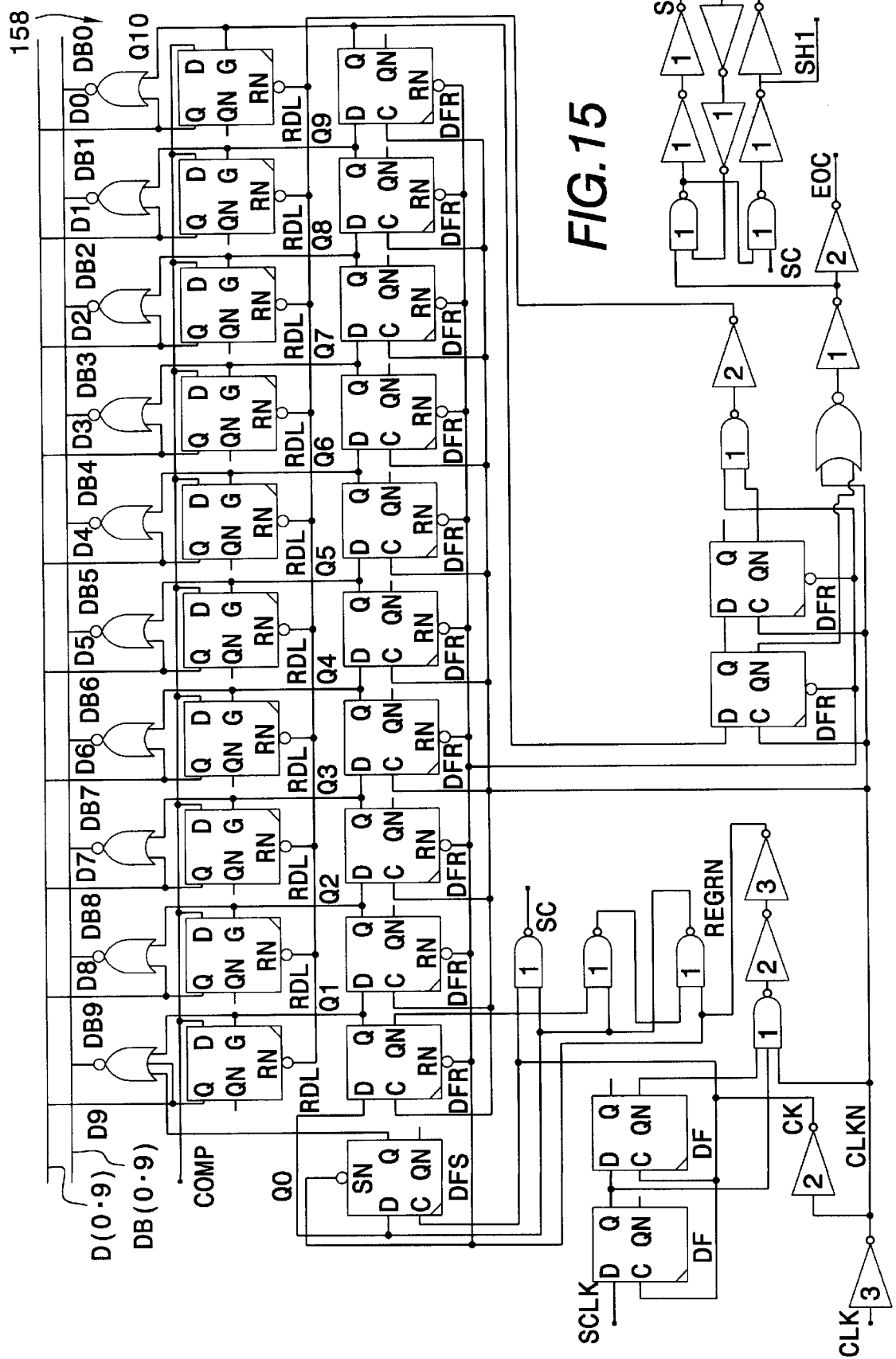
FIG. 15 is a schematic diagram of a successive approximation register for use with the analog-to-digital converter in the signal conditioning ASIC of a smart sensor module according to the present invention.
Figure 16:
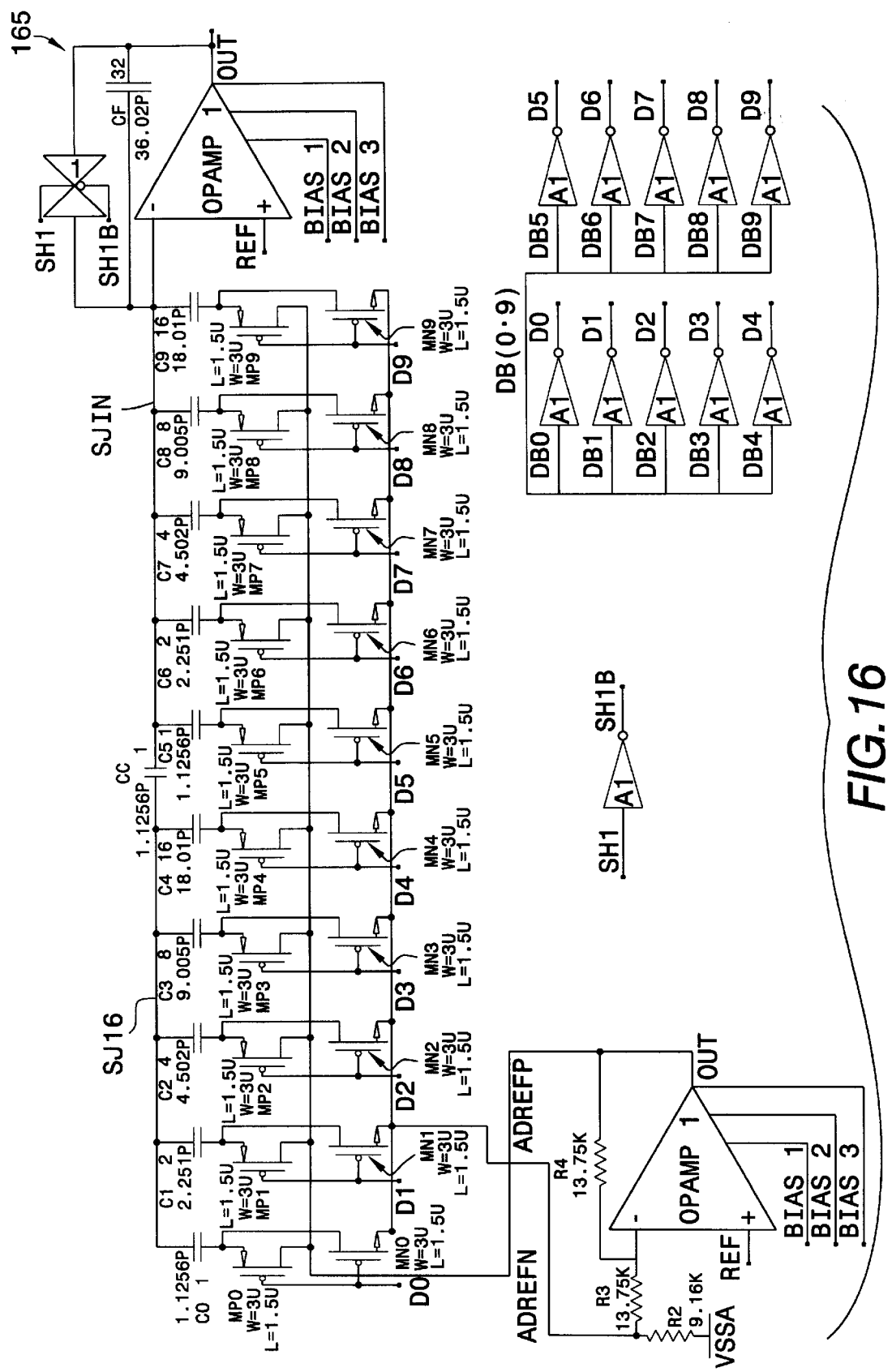
FIG. 16 is a schematic diagram of a capacitive DAC for use with the analog-to-digital converter in the signal conditioning ASIC of a smart sensor module according to the present invention.

Analog-to-digital converter (ADC) 140, as shown in FIG. 14, includes a 10-bit successive approximation register converter (SAR) 158, a sample and hold/charge redistribution circuit 163 and a capacitive DAC 165, the SAR and DAC being shown in greater detail in FIGS. 15 and 16, respectively. The sampling rate is controlled by control bits DI26 and DI27 of the CDW, which are applied at the SAR input labeled SCLK in FIG. 15, and can be selected from 2 to 16 times the SCF corner frequency. The range of the ADC is preferably 3 V, with a resolution of 10 bits, a step size of 2.93 mV, monotonicity of ±1 LSB, ±0.5 LSB typical, and a conversion time of 16 multiplied by the SCF clock period. Sampling time for the ADC is preferably synchronized with or equal to the SCF clock period, with a maximum clock frequency of 512 kHz, a minimum conversion time of 31.2 µs, and a maximum sampling rate of 32 kHz. Tables VII and VIII below illustrate the output code of the ADC and the sampling rate control, respectively.

TABLE VII

Output Code of ADC

| Voltage @ Input | Output Code (MSB D90, D80, D70, D60, D50, D40, D30, D20, DI0, D00 LSB) |
|---|---|
| $V_{REF} + 1.4985$ V | 1111111111 |
| $V_{REF} + 1.4956$ V | 1111111110 |
| : | : |
| $V_{REF} + 1.46$ mV | 1000000000 |
| $V_{REF} - 1.46$ mV | 0111111111 |
| : | : |
| $V_{REF} - 1.4956$ V | 0000000001 |
| $V_{REF} - 1.4985$ V | 0000000000 |

TABLE VIII

Sampling Rate Control

| DI27 | DI26 | Sampling Ratio Sample Rate/SCF $F_{3dB}$ | Sample Clock for SCF $f_{3dB}$ = 244.1 Hz (Hz) |
|---|---|---|---|
| 0 | 0 | 2:1 | 488.3 |
| 0 | 1 | 4:1 | 976.6 |
| 1 | 0 | 8:1 | 1953.1 |
| 1 | 1 | 16:1 | 3906.2 |

Temperature sensor 154 is preferably a standard ratiometric temperature sensor using matched bipolar transistors and exploiting the variation in the base to emitter voltage over temperature. For example, a suitable temperature sensor could have a temperature sensing range of between about −40° Celsius (C) and about 70° C., with a typical resolution of about 9.0 mV/C (0.3° C./ADC bit), and a designed voltage output as shown in Table IX below.

TABLE IX

Designed Voltage Output of Temperature Sensor

| Temp (C.) | Voltage |
|---|---|
| −40 | $V_{REF} - 474$ mV |
| +70 | $V_{REF} + 473$ mV |

Referring still to FIG. 2, analog-to-digital converter (ADC) 140 sends the conditioned digital output signal to an output data port 160 for communication with microcontroller 104 and a conversion complete pulse (CNVC) to both the output data port and input data port 162. Oscillator circuit 164 and clock generator 166 receive data from input data port 162 and feed clock signals to SCF anti-aliasing filter 136, ADC 140 and output data port 160.

Figure 17:
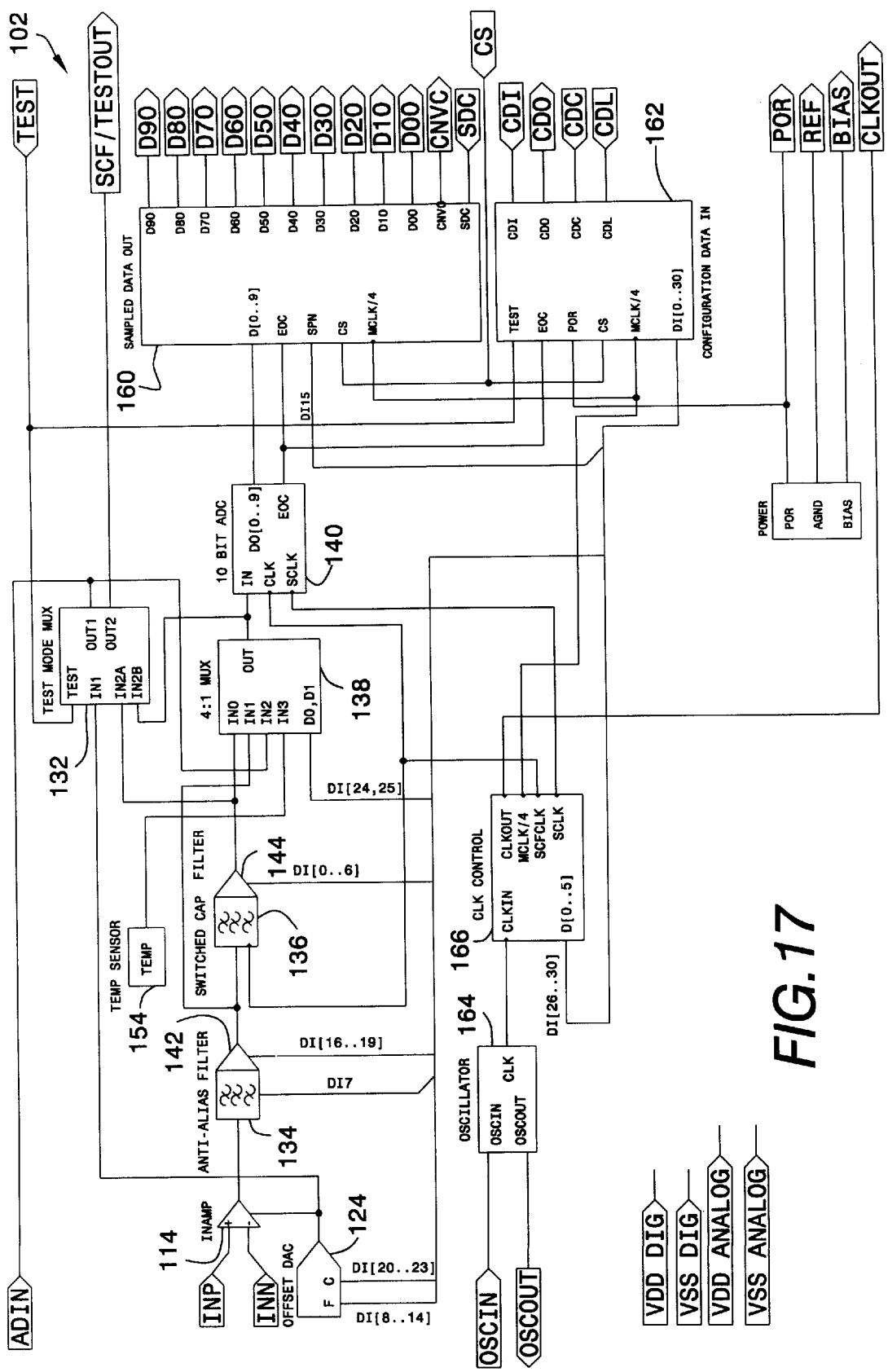
FIG. 17 is another schematic diagram of the signal conditioning ASIC shown in FIG. 1 illustrating the pin connections in greater detail.

Referring now to FIG. 1 and the schematic diagram of signal conditioning ASIC 102 shown in FIG. 17, if input is defined as data from sensor 108 or microcontroller 104 to the signal conditioning ASIC 102 and output is defined as data from the ASIC to the microcontroller, it can be seen that the INN and INP pins are the negative input and positive input, respectively, to the instrumentation amplifier 114. The ADIN pin is an external input to the multiplexer 138 which can be used to control the input to the analog-to-digital converter 140.

The SCF output is a direct analog output from the SCF AAF 136. $V_{DD}$, the positive power supply, is preferably equal to 5 Volts (V). $V_{SS}$ is ground, and $V_{REF}$ is a buffered output tied to the on chip analog ground and is preferably equal to ½$V_{DD}$ (e.g., 2.5 V). The minimum peak-to-peak output swing is preferably equal to $V_{REF}$±1.5V. $I_{REF}$, the minimum output current for $V_{REF}$ is preferably ±150 µA. $I_{OUT}$, the minimum output current, is preferably equal to 50 µA. $R_L$, the minimum output load to $V_{REF}$ is preferably 30 kΩ, and $R_S$, the output impedance is preferably 2.0 kΩ maximum.

The TEST pin controls the functioning of the multiplexer (MUX) and the SCF output in a manner to facilitate testing of the ASIC. The TEST pin preferably has an internal 10 µA pull down transistor to reduce external parts count and minimum bonding requirements. The CS pin is the chip select which enables the transfer of data to and from the microcontroller. The CDL pin enables the latch for the configuration data input from the microcontroller. The CDI pin is the input for the configuration data from the microcontroller. The CDC pin is the clock input from the microcontroller which controls the transfer of data from the microcontroller to the ASIC. The SDC pin is the clock input from the microcontroller which controls the transfer of sensor data from the ASIC to the microcontroller.

For the pins labeled Test, CS, CDL, CDI, CDC, SDC: $R_{in}$, the minimum input resistance is preferably 1 MΩ; $I_{in}$, the maximum leakage current is preferably 1 µA; $C_{in}$, the maximum input capacitance is preferably 10 pF; $V_{INH}$, the minimum input voltage for guaranteed HI is preferably 0.8 $V_{DD}$; $V_{INL}$, the maximum input voltage for guaranteed LOW is preferably 0.2 $V_{DD}$; and $I_{PD}$, the minimum pull down current on TEST pin, is preferably 10 µA.

The CDO pin allows the microcontroller to verify the previous configuration data sent to the ASIC. The D9O/PD3/

SDO pin is used to transfer sensor data from the ASIC to the microcontroller when in the serial or parallel data transfer modes. The D8O/PD2, D7O/PD1, D6O/PD0 pins are used to transfer data in the 10 bit and 4 bit parallel modes. The D5O, D4O, D3O, D2O, D1O, D0O pins are used only in the 10 bit parallel mode. The CLKOUT pin is a buffered master clock output for use by the microcontroller, the frequency of the microcontroller being the same as the oscillator configured on OSCIN and OSCOUT.

For the pins labeled CDO, D9O/PD3/SDO, D8O/PD2, D7O/PD1, D6O/PD0, D5O, D4O, D3O, D2O, D1O, D0O, and CLKOUT: $I_{DH}$, the maximum output current for guaranteed HI, is preferably 200 µA; $I_{IL}$, the maximum input current for guaranteed LOW is preferably 200 µA; $V_{OH}$, the minimum voltage at maximum output current for HI, is preferably 0.8 $V_{DD}$; and $V_{OL}$, the maximum voltage at maximum input current for LOW, is preferably 0.2 $V_{DD}$.

The BIAS pin allows the user to increase or decrease the current drive and consequently the gain bandwidth, of the opamps in the ASIC, with $R_{BIAS}$, RES to $V_{DD}$ preferably being 100 kΩ internal (25 kΩ~1 Mhz) and RES to $V_{SS}$ having a yet to be determined minimum.

The Power On Reset (POR) pin is a power on reset, implemented as an open drain transistor which pulls down the POR line when the power supply voltage is between 1.6 V and 3.2 V. $I_{OL}$, the maximum sink current for $V_{OL}$ is preferably 200 µA. $V_{OL}$, the maximum voltage for $I_{OL}$ is preferably 0.2 $V_{DD}$, and $I_{LH}$, the maximum leakage current for HI is preferably 5 µA.

The OSCIN and OSCOUT pins are used for generating the master clock on the ASIC. It is preferably implemented as a linear oscillator to minimize current consumption, the oscillator preferably being designed for a crystal or ceramic resonator with a minimum frequency of about 1 Mhz and a maximum frequency of about 16 MHZ.

Referring still to FIGS. 1 and 17, the configuration data word (CDW) is preferably transferred between microcontroller 104 and input port 162 of the ASIC via five lines labeled as follows:

1. Chip Select (CS)
2. Configuration Data In (CDI)
3. Configuration Data Out (CDO)
4. Configuration Data Clock (CDC)
5. Configuration Data Latch (CDL).

The CDW can, however, be transferred over a minimum of three lines (i.e., CDI, CDC and CDL). The control data or CDI of the CDW is four (4) bytes long and has the following format:

| | MSB | | | LSB |
|---|---|---|---|---|
| CDW bit# | 31    24 | 23    16 | 15    8 | 7    0 |
| DATA BLOCK | 1AAABBCC | DDDDEEEE | FGGGGGGG | HIIIIIII |
| | Byte 1 | Byte 2 | Byte 3 | Byte 4 |

The first byte of the CDI signal contains a one (1) followed by data blocks A, B and C. The second byte of the CDI signal contains data blocks D and E. The third byte of the CDI signal contains data blocks F and G, and the fourth byte of the CDI signal contains data blocks H and I. The most significant bit (MSB) (i.e., bit 31) of the CDI signal is always a one (1). Data block A contains 3 bits (i.e., bits 30, 29 and 28 of the CDI signal) which set the master clock (CLKOUT) divide setting for the switched capacitor filter 136. Data block B (SAMPLE CLOCK) contains 2 bits (i.e., bits 27 and 26 of the CDI signal) which set the sample clock divide setting for ADC 140. Data block C (MULTIPLEXER) contains 2 bits (i.e., bits 25 and 24 of the CDI signal) which select the input to ADC 140 from MUX 138 (e.g., 00 for the conditioned analog signal or 11 for the analog signal from temperature sensor 154). Data block D (COARSE OFFSET) contains 4 bits (i.e., bits 23, 22, 21 and 20 of the CDI signal) which define the coarse offset setting. Data block E (COARSE GAIN) contains 4 bits (i.e., bits 19, 18, 17 and 16 of the CDI signal) which define the coarse gain setting. Data block F (PAR/SER) contains 1 bit (i.e., bit 15 of the CDI signal) which selects a 4-bit parallel port when the bit is a zero (0) or a serial port when the bit is a one (1). Data block G (FINE OFFSET) contains seven 7 bits (i.e., bits 14, 13, 12, 11, 10, 9 and 8 of the CDI signal) which define the fine offset adjustment setting. Data block H (FILTER SELECT) contains 1 bit (i.e., bit 7 of the CDI signal) which selects a 5 kHz (e.g., when bit 7 is a 0) or 20 kHz (e.g., when bit 7 is a 1) continuous filter. Data block I (FINE GAIN) contains 7 bits (i.e., bits 6, 5, 4, 3, 2 and 1 of the CDI signal) which define the fine gain setting.

The analog-to-digital converter data output is preferably transferred between ADC 140 and microcontroller 104 over thirteen (13) lines labeled as follows:

1. Chip Select (CS)—same as for input
2. Sampled Data Out Clock (SDC)
3. Data Out 9 (D9O/PD3/SDO)
4. Data Out 8 (D8O/PD2)
5. Data Out 7 (D7O/PD1)
6. Data Out 6 (D6O/PD0)
7. Data Out 5 (D5O)
8. Data Out 4 (D4O)
9. Data Out 3 (D3O)
10. Data Out 2 (D2O)
11. Data Out 1 (D1O)
12. Data Out 0 (D0O)
13. Conversion Complete (CNVC).

The ADC result can, however, be transferred over a minimum of three (3) lines in serial mode (i.e., using the SDC, SDO, CNVC lines).

The conversion complete (CNVC) signal is a positive logic output pulse indicating when a new ADC result is available for transfer. The duration of the pulse is defined as CLKOUT/4, which is 1 µs for a 4 MHz clock on CLKOUT. The conversion time for the ADC is 16 cycles of the SCF clock.

As best seen in FIG. 17, the signal conditioning ASIC 102 also preferably includes a TEST pin to reconfigure the ADIN pin and SCF pin. When the test pin is high, pin ADIN will be connected to the offset adjustment DAC, and SCF will be connected to the ADC multiplexer output. The automatic rollover for the temperature setting of the ADC multiplexer is typically disabled in test mode.

Figure 18:
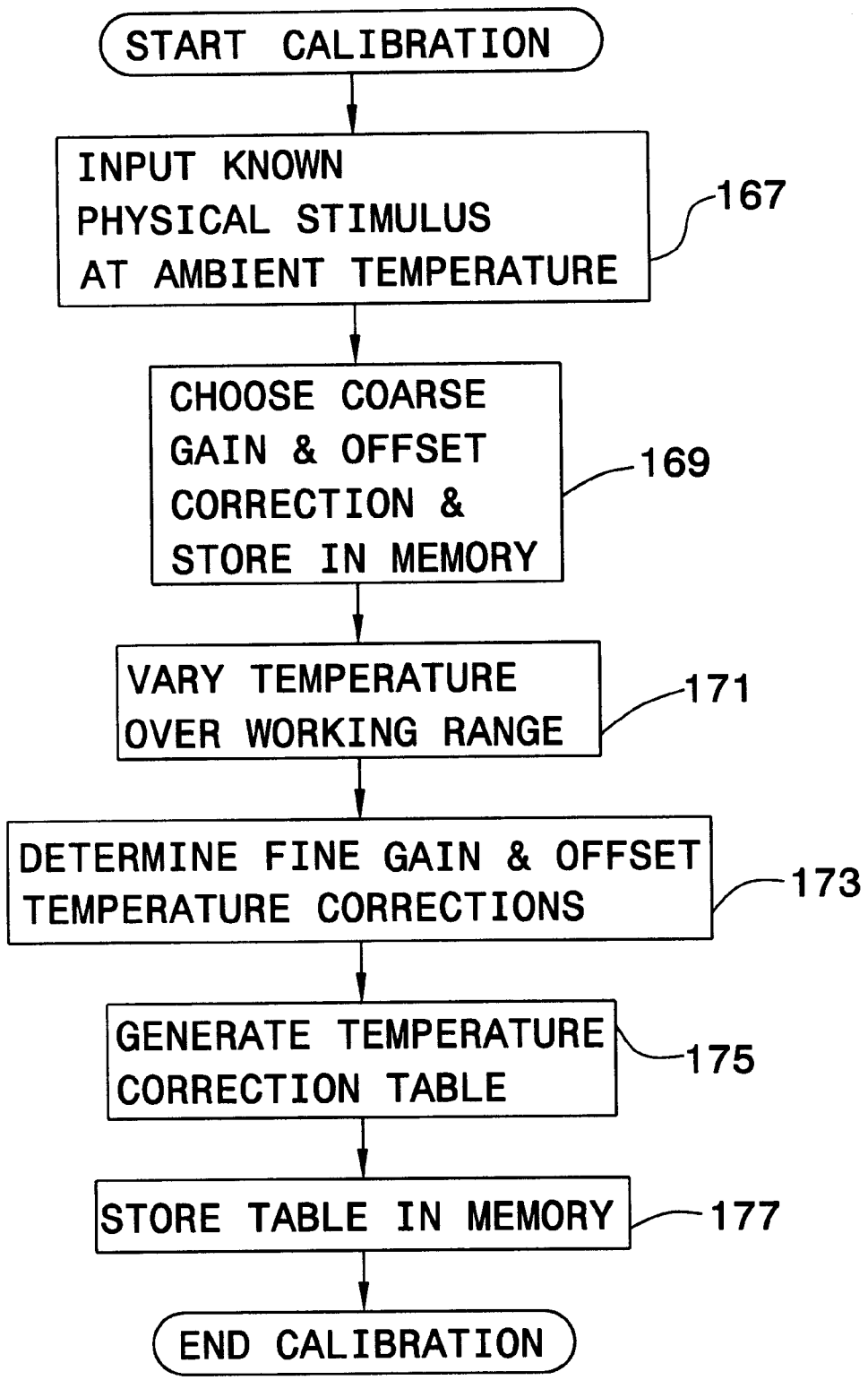
FIG. 18 is a flow chart describing a calibration procedure for use with the smart sensor module according to the present invention.

A calibration procedure is performed each time a sensor 108 is connected to the smart sensor module 100. An exemplary calibration procedure, shown in FIG. 18 in the form of a flow chart, includes the steps of determining the coarse gain and offset adjustment necessary to correct for sensor-to-sensor offset variations and generating a look-up table or equation to correct for temperature-induced variations dynamically during operation. As illustrated in blocks 167 and 169 of the flowchart, the coarse gain and offset adjustments are determined during the calibration procedure by taking measurements while applying known physical stimuli such as pressure or acceleration to the sensor at ambient temperature, calculating the coarse gain and offset corrections for the sensor and storing the coarse corrections in non-volatile memory, for example using the program memory (PROM) of the microcontroller 104 or an electrically erasable programmable read-only memory (EEPROM) (see FIG. 22). The coarse corrections are typically chosen to center the digital output signal at about half the ADC range (e.g., at 512 for a range between 0 and 1023 counts) and to scale the signal for a convenient conversion factor (e.g., 10 counts/psi), being careful not to exceed the minimum or maximum ADC converter output count or reduce the resolution below the minimum ADC quantization step size. It is also important that the coarse gain and offset at ambient temperature be chosen so that the full range of fine gain and offset can be utilized over the temperature range to correct for temperature-induced variations without the need of having to change the coarse settings. More specifically, the coarse corrections at ambient should be chosen so that the signal can be properly centered and scaled during calibration using fine corrections that fall within ¼ and ¾ of the full fine correction range (e.g., between 32 and 96 mV for a fine offset correction range of 127 mV). For example, if the signal is properly centered and scaled using the full fine correction setting or output (e.g., an integer value of 127), any temperature-induced variation requiring an increase in gain or offset will require the coarse correction to be increased and the fine correction to be decreased. If, however, the coarse correction is scaled back during calibration so that the fine correction falls within ¼ and ¾ of the fine correction range, most temperature-induced variations requiring an increase in gain or offset can be corrected merely by increasing the fine correction.

Once the coarse gain and offset corrections are determined and stored in memory, a look-up table or equation can be created or defined to permit fine gain and offset corrections to be determined dynamically during operation. For example, as shown in blocks 171, 173 and 175, a look-up table can be created during the calibration procedure by varying the temperature over the anticipated working range, determining the fine gain and offset corrections for selected temperatures, and generating a temperature correction table. The temperature correction table is also preferably stored in non-volatile memory as shown in block 177.

Figure 19:
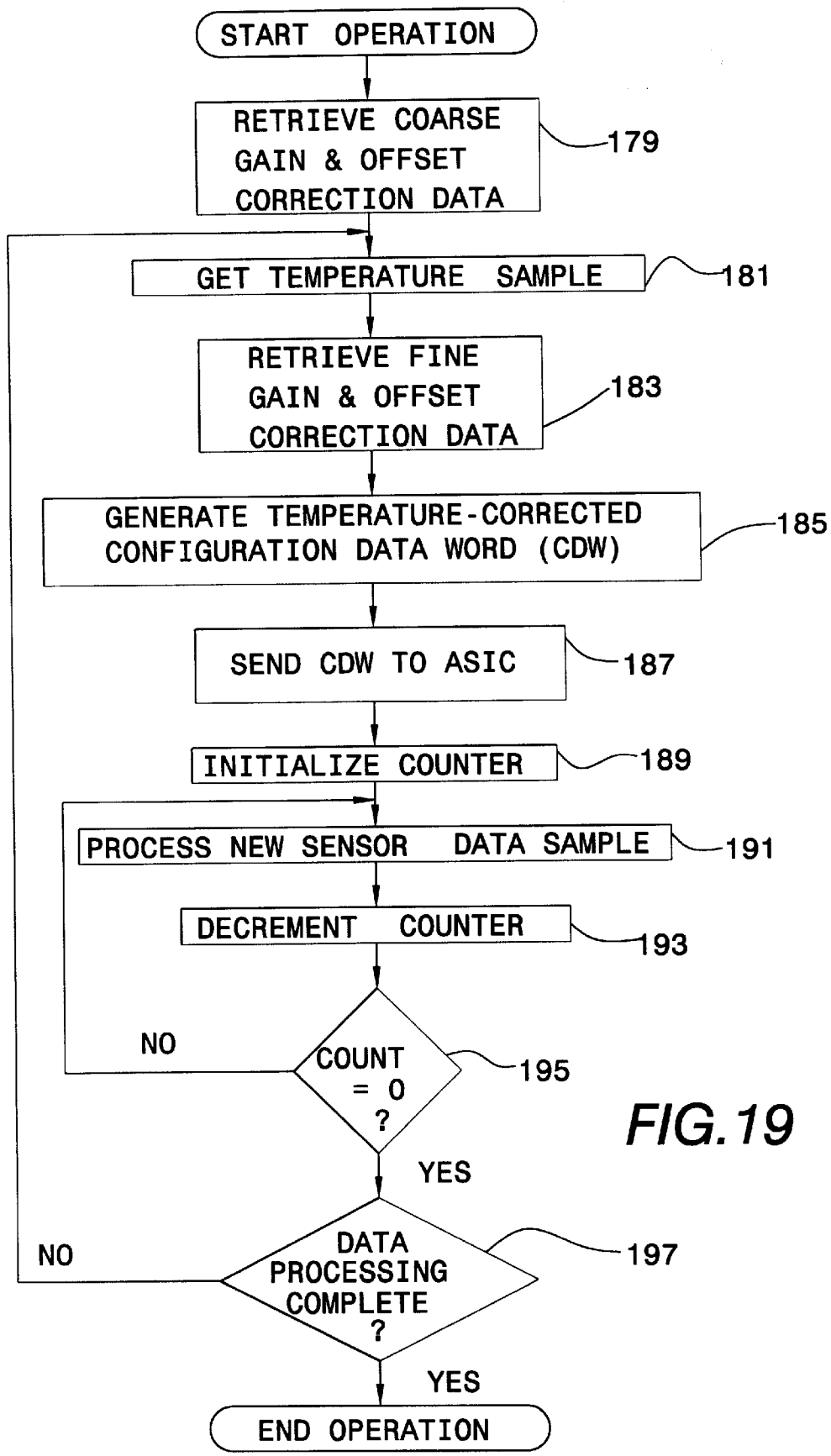
FIG. 19 is a flow chart describing operation of the microcontroller in a smart sensor module according to the present invention.

Referring to FIG. 19, operation of the smart sensor module 100 will now be described with reference to a flow chart illustrating basic microprocessor functions. In operation, ASIC 102 will initially assume a predetermined default configuration and will immediately begin conditioning analog signals from sensor 108 and converting the conditioned analog signals to digital signals which are communicated with microcontroller 104. Microcontroller 104 retrieves the coarse gain and offset correction data from memory as shown at block 179 and, typically ignoring the initial data from ASIC 102, will generate a configuration data word (CDW) requesting a temperature sample as shown in block 181. Alternatively, the microcontroller can initially send a default CDW to the ASIC while the system is stabilizing and, after the system has stabilized, send a CDW requesting a temperature sample. An example of a power-on configuration data input (CDI) which can be sent to the ASIC as part of a default CDW is shown in Table X below with resulting data for CLKOUT=4 MHZ included in parentheses.

TABLE X

| Data Block | Data Bits | Result |
|---|---|---|
| A | 100 | SCF CLOCK = CLKOUT/64 (62.5 kHz) and SCF $f_c$ = SCF CLK/256 (244 Hz) |
| B | 10 | ADC sample rate = 8 × SCF $f_c$ (1.95 khz) |
| C | 00 | Sensor channel, (11 is temperature sensor) |
| D | 0110 | AGND – 64 mV |
| E | 0000 | Minimum gain + 0dB |
| F | 1 | Serial mode |
| G | 1000000 | Coarse offset setting + 64mV (Sensor Reference = AGND) |
| H | 0 | 5 kHz continuous filter |
| I | 1000000 | Minimum gain + coarse gain + 3dB (Total 29 dB) |

Figure 20:
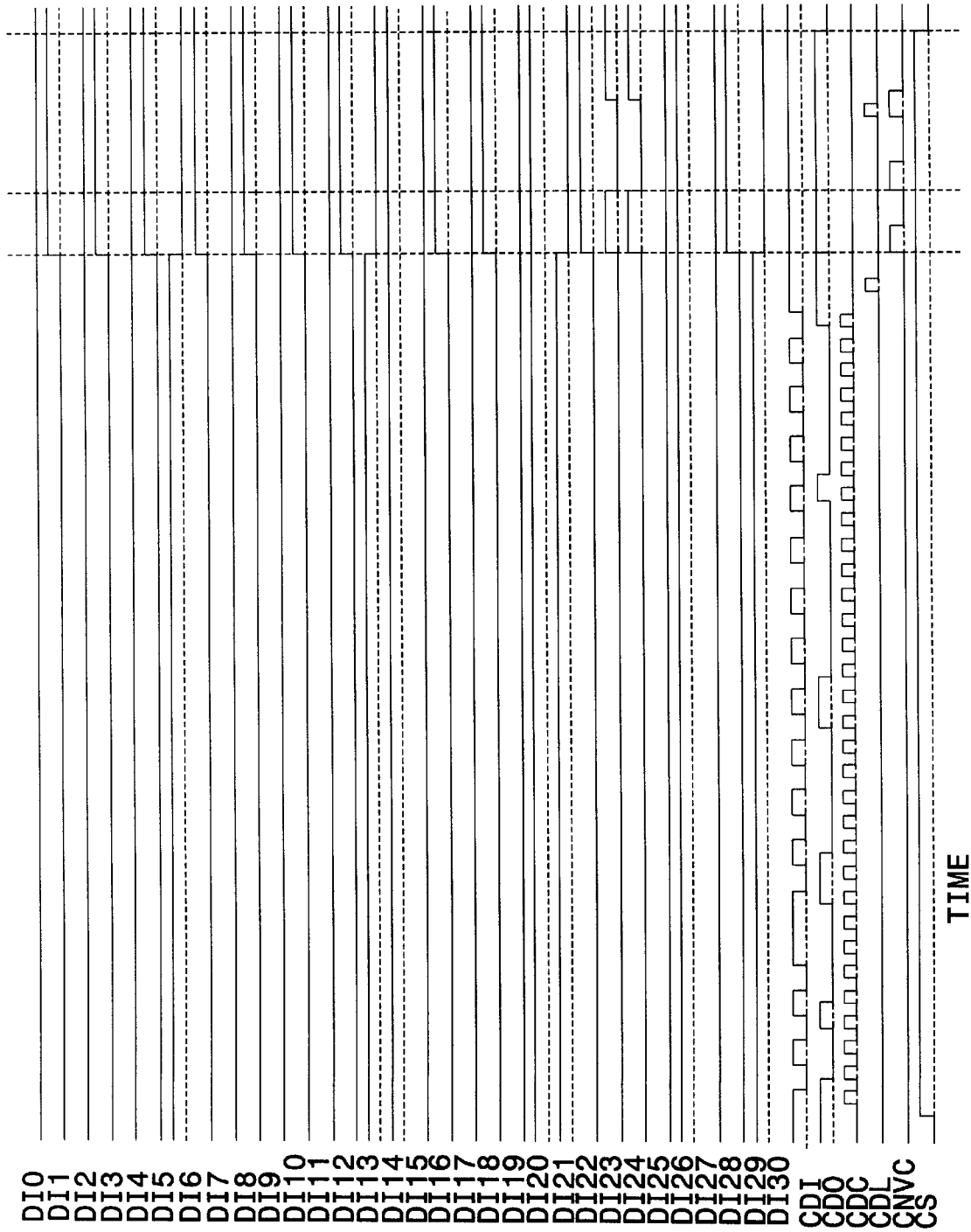
FIG. 20 is a timing diagram illustrating transfer of the configuration data word from the microcontroller to the signal conditioning ASIC.

In either case, at least three signals (CS, CDI and CDL) are sent as part of the CDW from the microcontroller to input port 162 which is activated when the chip select (CS) signal from the microcontroller is high. Referring now to the timing diagram shown in FIG. 20, the configuration data input (CDI) signal is clocked into a 32 bit shift register at ASIC input port 162 using the configuration data clock (CDC) signal from microcontroller 104. As the new CDI signal is clocked in, the previous configuration data is preferably shifted out as a configuration data output (CDO) signal from the ASIC input port to the microcontroller for verification. When all 32 bits of the new CDI have been clocked into the configuration data word input register, a rising edge on the configuration data latch (CDL) enables the data latch. The configuration data is then latched on the following conversion complete (CNVC) pulse from ADC 140 and sent to another register (lines DI0–DI30 in FIG. 11) directly controlling the analog circuits of the ASIC.

If multiplexer 138 has been configured to feed a sample from temperature sensor 154 to ADC 140, the sample will be available to the microcontroller on the CNVC pulse after the CNVC pulse which latches the configuration data requesting the temperature sample. After a temperature sensor sample has been taken, multiplexer 138 is configured to automatically revert back to sampling the sensor channel.

Output data port 160 transmits a CNVC pulse to microcontroller 104 to indicate when a new ADC result is available for transfer. As mentioned above, data can be transferred from ASIC 102 to microcontroller 104 in serial or parallel mode. In 4-bit parallel mode, a seven line interface is preferably used including the following lines: Chip Select (CS), Sampled Data Out Clock (SDC), Data Out 9 (D9O/PD3/SDO), Data Out 8 (D8O/PD2), Data Out 7 (D7O/PD1), Data Out 6 (D6O/PD0), and Conversion Complete (CNVC). In full parallel mode, a twelve line interface can be used including the following lines: Chip Select (CS), Data Out 9 (D9O/PD3/SDO), Data Out 8 (D8O/PD2), Data Out 7 (D7O/PD1), Data Out 6 (D6O/PD0), Data Out 5 (D5O), Data Out 4 (D4O), Data Out 3 (D3O), Data Out 2 (D2O), Data Out 1 (D1O), Data Out 0 (D0O), and Conversion Complete (CNVC). In serial mode, a minimum of three lines are needed including SDC, CNVC, and a sampled data out (D9O/PD3/SDO) line. If a sample from temperature sensor 154 has been fed to ADC 140, one sensor channel data point will be replaced with a temperature data point.

Figure 21:
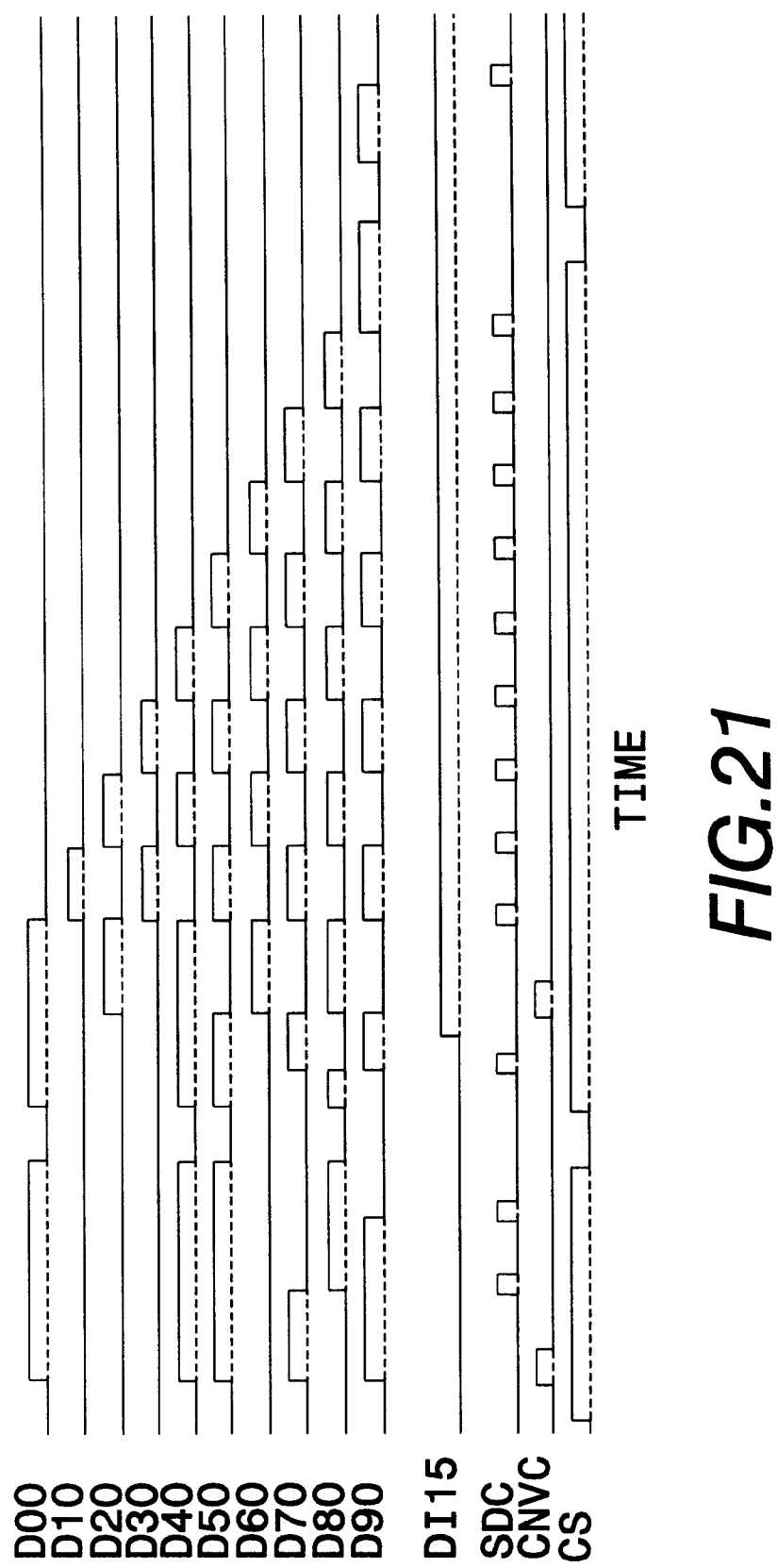
FIG. 21 is a timing diagram illustrating transfer of the sampled data output from the signal conditioning ASIC to the microcontroller.

The data from ADC 140 is clocked out of ASIC output port 160 in serial or 4-bit parallel mode when chip select (CS) is high. When CS is low the outputs are at high impedance. Referring to the timing diagram in FIG. 21, it will be appreciated that when bit 15 (data block F) of the CDI is low, a serial transfer mode is selected and, when bit 15 of the CDI is high, a 4-bit parallel transfer mode is selected. In serial mode, the data is shifted out a single SDO line (e.g., the pin of the ASIC labeled D9O/PD3/SDO in FIG. 1) with the MSB being shifted first. The MSB of the ADC result is typically valid at pin D9O/PD3/SDO about 100 nsec after the rising edge of the CNVC pulse. The subsequent data is typically valid at pin D9O/PD3/SDO about 100 nsec after the rising edge of each SDC pulse. The ten data bits of the ADC result are clocked out sequentially as follows:

|  | MSB |  |  |  |  |  |  |  | LSB |  |
|---|---|---|---|---|---|---|---|---|---|---|
| A/D result | D9 | D8 | D7 | D6 | D5 | D4 | D3 | D2 | D1 | D0 |
| SDC Clock # | 0 | 1 | 2 | 3 | 4 | 5 | 6 | 7 | 8 | 9 |
|  | D9 | D8 | D7 | D6 | D5 | D4 | D3 | D2 | D1 | D0 |

In 4-bit parallel mode, the data is clocked out over four lines designated PD3, PD2, PD1 and PD0 (corresponding to the pins of the ASIC labeled D9O/PD3/SDO, D8O/PD2, D7O/PD1 and D6O/PD0, respectively, in FIG. 1). ADC results D9, D8, D7 and D6 are transferred over lines PD3, PD2, PD1 and PD0, respectively, after the rising edge of the CNVC pulse. On the SDC clock pulse following the CNVC pulse, ADC results D5, D4, D3 and D2 are transferred over lines PD3, PD2, PD1 and PD0, respectively. On the second SDC clock pulse following the CNVC pulse, ADC results D1 and D0 are transferred over lines PD3 and PD2, respectively. The ADC results D9, D8, D7 and D6 are typically valid on pins D9O/PD3/SDO, D8O/PD2, D7O/PD1 and D6O/PD0, respectively, about 100 nsec after the rising edge of the CNVC pulse. The ADC results D5, D4, D3 and D2 are typically valid on pins D9O/PD3/SDO, D8O/PD2, D7O/PD1 and D6O/PD0, respectively, about 100 nsec after the rising edge of the first SDC pulse following the CNVC pulse. The ADC results D1 and D0 are typically valid on pins D9O/PD3/SDO and D8O/PD2, respectively, about 100 nsec after the rising edge of the second SDC pulse following the CNVC pulse.

As illustrated in block 183 of the flowchart shown in FIG. 19, the ADC results, including any temperature sample, are used by microcontroller 104 to retrieve fine gain and offset correction data from the look-up table or equation generated during the calibration procedure. A new configuration data word (CDW) containing the fine gain and offset correction data is then generated by microcontroller 104 as shown in block 185 and sent to ASIC 102 as shown in block 187. The new CDW is latched on the following conversion complete (CNVC) pulse from ADC 140 and sent to a register directly controlling the analog circuits of the ASIC. More specifically, configuration data blocks D and G of the CDW control coarse and fine offset adjustment, respectively, in first amplifier stage 114, while configuration data blocks E and I control coarse and fine gain adjustment in filtering stages 134 and 136, respectively.

As illustrated in blocks 189, 191 and 193 of the flow chart, a counter is initiated when the new CDW is latched and is decremented after the latest ADC result has been processed by microcontroller 104. Some examples of the types of processing that can be performed by the microcontroller include, but are not limited to, digital filtering, threshold sensing and integration. As indicated by decision block 195, processing of the ADC result continues until the count equals zero, after which a decision is made whether to continue or end operation as shown in block 197. If operation of the smart sensor module is to continue, the microcontroller will get another temperature sample and repeat the above steps. The value of the counter is chosen to define a predetermined interval between temperature samples which will depend in part on the clock speed of the processor as well as other factors such as the type of sensor and the nature of the measurement.

Figure 22:
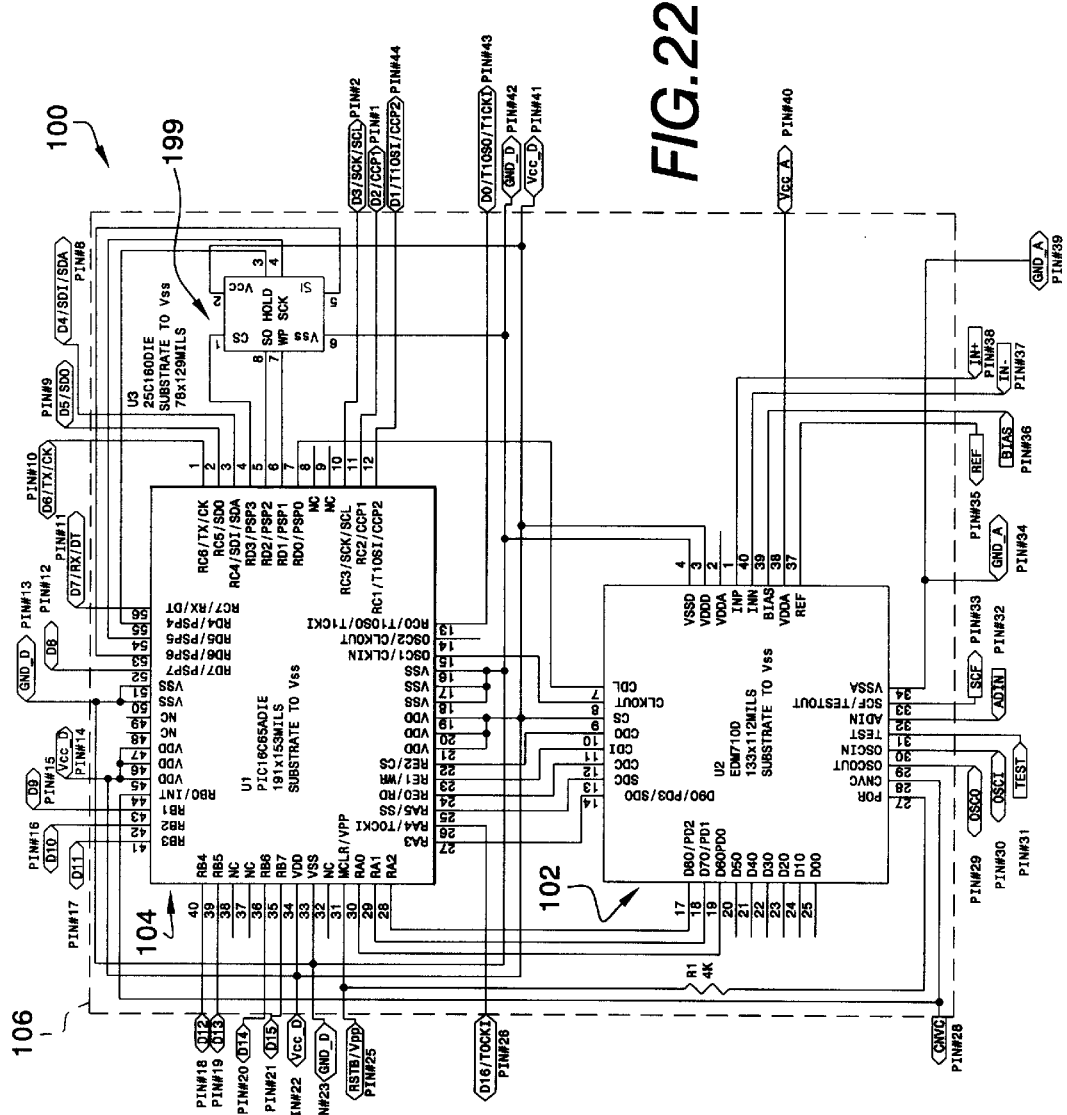
FIG. 22 is a schematic diagram of a modification of a smart sensor module according to the present invention including an electrically-erasable programmable read only memory.

A modification of a smart sensor module according to the present invention, shown in FIG. 22 at 100, is similar to the module shown in FIGS. 1 and 17 but with an electrically-erasable programmable read-only memory (EEPROM) module 199 connected to auxiliary peripheral ports or pins of the microcontroller 104 to store calibration data for the sensor as well as any other useful information. Use of an EEPROM to store calibration data is advantageous in that the EEPROM provides non-volatile memory which does not change when the module is powered down and which can be changed by the microcontroller any number of times using an easily programmed user interface. Program memory, on the other hand, can only be programmed a finite number of times and typically requires a special programmer which must apply a programming voltage in excess of five volts to reset the $V_{PP}$ line. The smart sensor module shown in FIG. 22 also differs from the smart sensor shown in FIG. 1 in the use of a PIC16C65ADIE microcontroller from Microchip Technology, Inc., of Chandler, Ariz., the microcontroller having somewhat different pin assignments but performing essentially the same functions as those described above.

Figure 23:
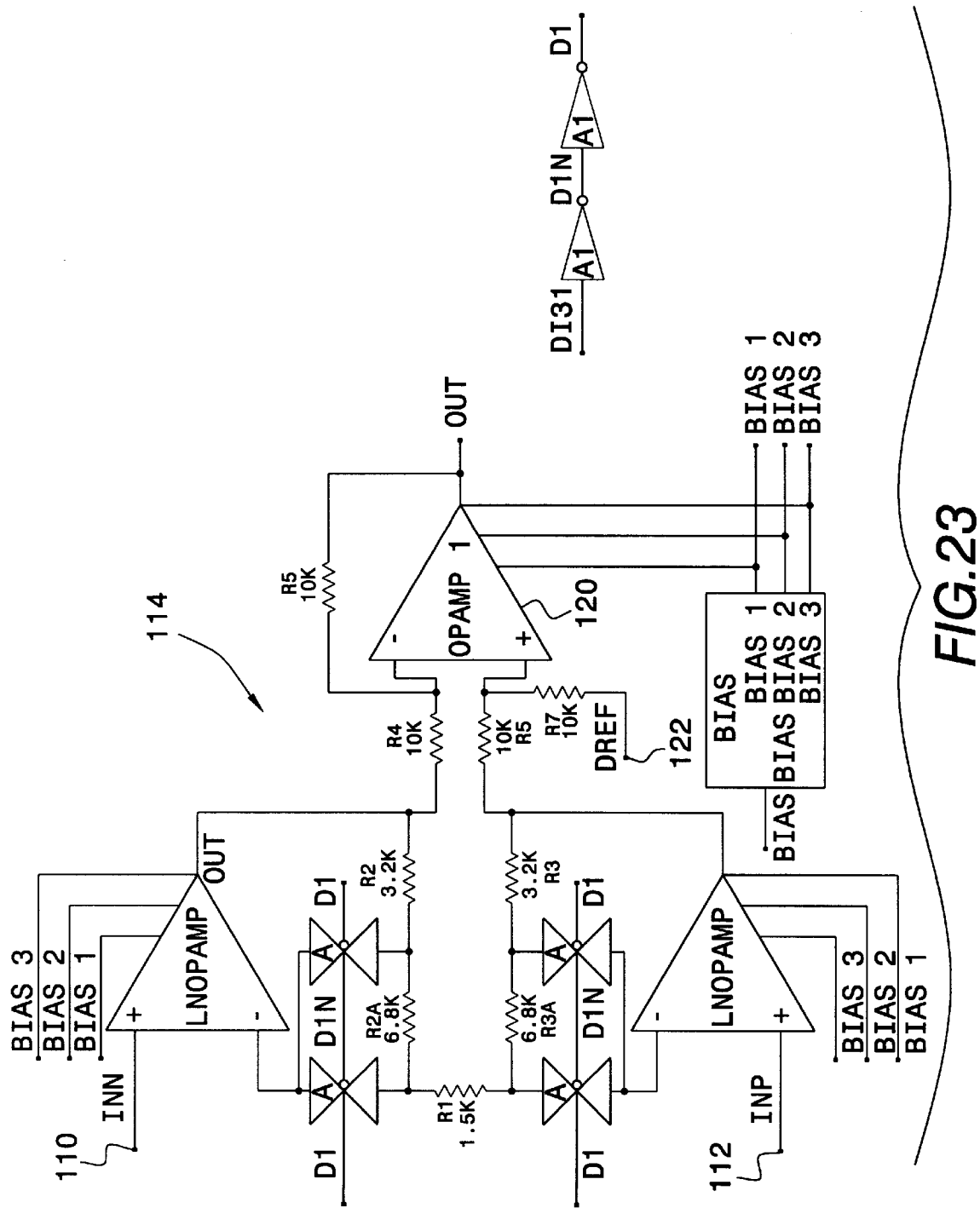
FIG. 23 is a schematic diagram of a modified instrumentation amplifier with digitally selectable gain for use with a signal conditioning ASIC according to the present invention.

A modified instrumentation amplifier for the smart sensor module according to the present invention, shown in FIG. 23 at 114, is similar to the instrumentation amplifier described above but with selectable gain controlled by configuration data bit 31 of the CDW, the configuration data bit being applied to the first amplifier stage via inputs D1 to chose the value of the feedback resistance. More specifically, when D1 is HI, the instrumentation amplifier is configured to deliver higher gain (e.g., 23 dB gain) and, when D1 is LO, the amplifier is configured to deliver lower gain (e.g., only 3 dB gain).

From the above, it will be appreciated that the smart sensor module according to the present invention can interface with a variety of resistive bridge and voltage output transducers to provide signal conditioning and decision making in a compact package. While the primary function of the smart sensor module is compensation of the transducer for device to device and temperature-induced errors, the module can also perform signal processing on the transducer signal including, but not limited to, digital filtering, threshold sensing and integration. Moreover, the smart sensor module allows very precise calibration of the sensor, signal processing capabilities, decision making capability and serial interface capability.

While operation of the signal conditioning circuitry and module according to the present invention has been described in connection with a voltage output sensor, it will be appreciated that the present invention can be used to interface with any type of transducer, including sensors and actuators. Some examples of the types of sensors that can be used include temperature, pressure, acceleration, and magnetic field sensors. Some examples of the types of actuators that can be used include electromagnetic, pneumatic, or hydraulic linear actuators and rotary motors. The sensors normally provide an analog electrical signal as output and the actuators normally accept an analog electrical signal as input. Means of impressing the input or output value on the analog electrical signal include varying the voltage, current, or frequency of the underlying carrier signal.

The smart sensor module according to the present invention can be implemented as a multichip device as shown or as a single chip to improve cost effectiveness, speed and reliability. The signal conditioning circuitry can be packaged with a microcontroller to form a smart sensor module or provided as an individual component for coupling with an external microcontroller if desired. Also, the signal conditioning circuitry can be implemented as a single application-specific integrated circuit (ASIC) as shown or in any other suitable form including, but not limited to, multiple ASICs, one or more field-programmable gate arrays, programmable logic arrays or as discrete components. If multiple ASICs are employed, an external sample clock can be used to synchronize the ASICs.

The instrumentation amplifier can be configured to have different fixed or selectable gains dependent upon the operational requirements of the signal conditioning circuitry. The coarse and fine offset correction can be implemented in any suitable manner including, but not limited to, four and seven bit implementations as shown or 5–8 bits for the coarse DAC and 8–16 bits for the fine DAC. The offset step sizes can also be varied, for example by specifying a fine offset step size of 0.1 mV rather than 1 mV for the fine DAC. The coarse and fine gain correction can also be implemented in any suitable manner including, but not limited to, four and seven bit implementations as shown or 5–8 bits for the coarse DAC and 8–16 bits for the fine DAC. The gain step sizes can also be varied and the gain can be defined in any desired manner, for example to be linear or exponential.

The analog-to-digital converter (ADC) can be configured for 10-bit operation as shown or for any other number of bits such as, for example, 8 to 24 bits. The ADC can also be configured for rail-to-rail operation (e.g., a 0–5 Volt input range as opposed to the 1–4 Volt input range described above). While a charge redistribution technique (i.e., capacitive DAC) is currently used for the ADC, it will be appreciated that any conventional technique can be used.

The signal conditioning circuitry can be implemented as multiple analog channels, e.g. from the instrumentation amplifier, the offset correction DACs, the continuous time anti-aliasing filter and the switched capacitor anti-aliasing filter, which feed a single multiplexer selecting a particular channel or circulating through all of the channels.

External capacitors can be employed for the continuous time anti-aliasing filter allowing the filter to be tailored to all possible switched capacitor filter setups.

A variety of digital interfaces can be used including, but not limited to, SPI, I²C and microwire buses. Use of the Chip Select (CS) pin or address pins can allow multiple devices on the same bus, preferably with the configuration data in (CDI) and digital data out. The ADC results can be sent serially over a single line, in parallel over multiple lines over several clock pulses, or sent all at once in parallel over multiple lines equal in number to the number of data bits. In serial mode, the ADC results are shifted out over a single data output (SDO) line. In one embodiment, the ADC results are wasted once they have been transferred; however, it is also possible to recirculate the results so that they are not wasted, for example by shifting the most recently transferred ADC result from the last register to the first register in a circular manner. The configuration data word (CDW) can also be transferred in serial or parallel mode.

The smart sensor module according to the present invention can also be used as a smart transducer interface module (STIM) to connect transducers to network capable application processors (NCAPs) in accordance with the IEEE 1451.2 and P1451.3 interface standards, the contents of which are incorporated herein by reference. More specifically, the smart sensor module memory can be used to store the transducer electronic data sheet (TEDS) defined by the standard as well as performing signal conditioning and analog to digital conversion with a programmable microcontroller or microprocessor.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A smart sensor module for compensation of sensor-to-sensor and temperature-induced errors in the analog output of a sensor comprising a temperature sensor providing an electrical output related to the temperature of the sensor;

fine gain and offset correction storage for storing fine gain and offset corrections for a plurality of different temperatures and, responsive to said temperature sensor output, for providing a fine gain correction output and a fine offset correction output;

coarse gain and offset correction storage for storing coarse gain and offset corrections and providing a coarse gain correction output and a coarse offset correction output;

an analog amplifier, having a DC offset responsive to said coarse and fine offset correction outputs, for amplifying the analog sensor output and providing an amplified analog sensor output;

a first low pass filter, having a filter gain responsive to said coarse gain correction output, for low pass filtering the amplified analog sensor output and providing a coarse gain corrected analog sensor output; and a second low pass filter, having a filter gain responsive to said fine gain correction output, for low pass filtering the coarse gain corrected analog sensor output and providing a fully conditioned analog sensor output.

2. A signal conditioning circuit for use with a microcontroller as a smart interface for an analog output sensor comprising coarse offset adjustment means, responsive to digital input from the microcontroller, for providing an analog coarse offset correction output to correct for offset errors due to sensor-to-sensor variations;

fine offset adjustment means, responsive to digital input from the microcontroller, for providing an analog fine offset correction output to correct for offset errors due to temperature-induced variations;

an amplifier stage, having a DC offset responsive to said fine and coarse offset correction outputs, for amplifying the analog sensor output and providing an amplified analog sensor output;

coarse gain adjustment means, responsive to digital input from the microcontroller, for providing an analog coarse gain correction output to correct for sensor-to-sensor variations;

a first low pass filter stage, having a filter gain responsive to said coarse gain correction output, for filtering the amplified analog sensor output and providing a coarse gain corrected analog sensor output;

fine gain adjustment means, responsive to digital input from the microcontroller, for providing an analog fine gain correction output to correct for temperature-induced variations; and a second low pass filter stage, having a filter gain responsive to said fine gain correction output, for filtering the coarse gain corrected analog sensor output and providing a fully compensated analog sensor output.

3. A method of compensating for sensor-to-sensor and temperature-induced errors in an analog sensor output using a microcontroller and signal conditioning analog circuitry comprising the steps of taking a temperature sample;

retrieving fine gain and offset correction outputs from storage based upon the temperature sample;

retrieving coarse gain and offset correction outputs from storage;

amplifying the analog sensor output in an amplifier stage of the signal conditioning analog circuitry having a DC offset responsive to the coarse and fine offset outputs retrieved from storage and providing an amplified analog sensor output;

filtering the amplified analog sensor output in a first low pass filter stage of the signal conditioning analog circuitry having a filter gain responsive to the coarse gain correction output retrieved from storage and providing a coarse gain corrected analog sensor output; and filtering the coarse gain corrected analog sensor output in a second low pass filter stage of the signal conditioning analog circuitry having a filter gain responsive to the fine gain correction output retrieved from storage and providing a fully compensated analog sensor output.

4. A method as recited in claim 3 and further comprising, prior to retrieving information from memory, the step of performing a calibration procedure including the steps of connecting a sensor to the signal conditioning circuit;

applying known physical stimuli to the sensor;

choosing coarse gain and offset corrections for the sensor;

storing the coarse gain and offset corrections in non-volatile memory;

varying the temperature over the anticipated working range;

generating fine gain and offset corrections for different temperatures;

storing the fine gain and offset corrections in non-volatile memory;

wherein coarse gain and offset are retrieved from memory initially and fine gain and offset are retrieved dynamically during operation.

5. A method as recited in claim 3 and further comprising the steps of converting the fully compensated analog sensor output to a fully compensated digital sensor output and transferring the fully compensated digital sensor output from the signal conditioning analog circuitry to the microcontroller.

6. A method as recited in claim 5 wherein said step of taking a temperature sample includes using an analog temperature sensor to generate an analog temperature sensor output, and further comprising the steps of converting the analog temperature sensor output to a digital temperature sensor output and transferring the digital temperature sensor output to the microcontroller.

7. A method as recited in claim 6 and further comprising, prior to said converting steps, the step of multiplexing the fully compensated analog sensor output and the analog temperature sensor output.

8. A method as recited in claim 6 wherein the first low pass filter stage includes a continuous time anti-aliasing filter with a selectable corner frequency and a resistive feedback circuit for controlling filter gain, and wherein said step of filtering the amplified analog sensor output in the first low pass filter stage includes selecting a corner frequency and a feedback resistance to make coarse gain corrections.

9. A method as recited in claim 8 wherein the second low pass filter stage includes a switched capacitor filter having a cutoff frequency controlled by varying a switched capacitor filter clock frequency, and wherein said step of filtering the coarse gain corrected analog sensor output in the second low pass filter stage includes selecting a cutoff frequency and adjusting values of capacitance in the switched capacitor filter in order to make fine gain corrections.

10. A smart sensor module as recited in claim 1 and further comprising a multiplexer having first and second input channels receiving said fully conditioned analog sensor output and said temperature sensor output, respectively, and an output channel providing an analog multiplexer output.

11. A smart sensor module as recited in claim 10 wherein said multiplexer further includes a third input channel receiving said coarse gain corrected analog sensor output.

12. A smart sensor module as recited in claim 11 wherein said multiplexer further includes a fourth input channel receiving an output from an external analog source.

13. A smart sensor module as recited in claim 10 and further comprising an analog output multiplexer with an input channel receiving at least one of said coarse and fine offset correction outputs, said coarse gain corrected analog sensor output, said fully conditioned analog sensor output, and said analog multiplexer output.

14. A smart sensor module as recited in claim 10 and further comprising an analog-to-digital converter receiving said analog multiplexer output and providing a digital output.

15. A smart sensor module as recited in claim 14 and further comprising a microcontroller for receiving said digital output from said analog-to-digital converter, retrieving said fine gain and offset corrections from storage based on said temperature sensor output, and transferring said fine gain and offset corrections to said second low pass filter and said analog amplifier, respectively.

16. A smart sensor module as recited in claim 15 wherein said microcontroller includes program memory and said fine gain and offset corrections and said coarse gain and offset corrections are stored in said program memory.

17. A smart sensor module as recited in claim 15 and further comprising an electrically erasable programmable read only memory, wherein said fine gain and offset corrections and said coarse gain and offset corrections are stored in said electrically erasable programmable read only memory.

18. A signal conditioning circuit as recited in claim 2 wherein said amplifier stage includes an input stage and an output stage, and wherein said coarse and fine offset corrections are used to define an adjustment voltage applied to an input of said amplifier output stage.

19. A signal conditioning circuit as recited in claim 2 wherein said first low pass filter stage includes a continuous time anti-aliasing filter having a selective corner frequency and a resistive feedback circuit for controlling filter gain.

20. A signal conditioning circuit as recited in claim 2 wherein said second low pass filter includes a switched capacitor filter having a capacitive array, said switched capacitor filter having a cutoff frequency controlled by varying a switched capacitor filter clock frequency and a filter gain controlled by adjusting relative values of capacitance in said capacitive array.

* * * * *